United States Patent
LaRowe et al.

(10) Patent No.: US 8,972,443 B2
(45) Date of Patent: *Mar. 3, 2015

(54) DISTRIBUTED PLATFORM FOR NETWORK ANALYSIS

(71) Applicant: ChalkLabs, LLC, Bloomington, IN (US)

(72) Inventors: Gavin H. LaRowe, Bloomington, IN (US); Bruce W. Herr, II, Bloomington, IN (US)

(73) Assignee: ChalkLabs, LLC, Bloomington, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,195

(22) Filed: Dec. 18, 2012

(65) Prior Publication Data

US 2013/0110871 A1    May 2, 2013

Related U.S. Application Data

(63) Continuation of application No. 12/638,756, filed on Dec. 15, 2009, now Pat. No. 8,352,495.

(51) Int. Cl.
G06F 17/30    (2006.01)

(52) U.S. Cl.
CPC .... G06F 17/30979 (2013.01); G06F 17/30864 (2013.01)
USPC ........................................................ 707/770

(58) Field of Classification Search
CPC ................... G06F 17/30864; G06F 17/30979; G06F 17/30539
USPC ................... 707/780, 736, 758, E17.014, 770
See application file for complete search history.

(56) References Cited

U.S. PATENT DOCUMENTS

| | | | |
|---|---|---|---|
| 5,161,216 A * | 11/1992 | Reps et al. ................... | 717/151 |
| 6,456,989 B1 | 9/2002 | Kawamura et al. | |
| 6,470,335 B1 * | 10/2002 | Marusak ............................... | 1/1 |
| 2002/0129017 A1 | 9/2002 | Kil et al. | |
| 2003/0018634 A1 | 1/2003 | Shringeri et al. | |
| 2004/0243645 A1 | 12/2004 | Broder et al. | |
| 2005/0125213 A1 | 6/2005 | Chen et al. | |
| 2008/0046426 A1 | 2/2008 | Russell et al. | |
| 2008/0059437 A1 | 3/2008 | Nagappan | |
| 2008/0076106 A1 * | 3/2008 | Collier .......................... | 434/322 |
| 2008/0215549 A1 | 9/2008 | Annau et al. | |
| 2009/0144276 A1 | 6/2009 | Russell et al. | |
| 2009/0222782 A1 | 9/2009 | Bayati et al. | |
| 2010/0228760 A1 * | 9/2010 | Chen et al. .................... | 707/759 |
| 2011/0145286 A1 | 6/2011 | LaRowe et al. | |

OTHER PUBLICATIONS

LaRowe, "NIH SBIR Grant Proposal", Oct. 29, 2008, 18 pages.
Non-Final Office Action for U.S. Appl. No. 12/638,756, mailed on Jan. 3, 2012, Gavin H. LaRowe et al., "Distributed Platform for Network Analysis", 18 pages.
PCT Search Report mailed Aug. 2, 2011 for PCT application No. PCT/US10/60220, 9 pages.

* cited by examiner

*Primary Examiner* — Shiow-Jy Fan
(74) *Attorney, Agent, or Firm* — Han Santos Ringer, PLLC

(57) ABSTRACT

The present disclosure describes an apparatus and methods for performing data analysis, in particular network analysis. Specifically it provides a framework and user interface whereby raw data may be imported into a data model with entities, attributes, and relationships between the entities and multiple data analysis algorithms may be pipelined into a larger data analysis model and applied to the data model. Offline and online data visualization and data exploration techniques, may be applied to the results of the data analysis enabling real-time and near real-time interactive online analysis. Extensibility models and market transaction models are also provided.

20 Claims, 15 Drawing Sheets

DISTRIBUTED PLATFORM FOR NETWORK ANALYSIS

RELATED APPLICATIONS

This patent application claims priority from U.S. utility patent application entitled DISTRIBUTED PLATFORM FOR NETWORK ANALYSIS with application Ser. No. 12/638,756 filed Dec. 15, 2009, which is fully incorporated by reference herein.

TECHNICAL FIELD OF THE SUBJECT MATTER

The subject matter of the present application relates to the computer science/electrical arts, more specifically to network a

BACKGROUND OF THE SUBJECT MATTER

Computer automation enables analysis of large amounts of data that previously was not practical to perform. As computer technology improves, so too does the amount of data that may be analyzed, and the complexity of the analysis that may be performed. For certain types of analyses, computer performance has increased to the point where the analysis may be performed substantially in real time, enabling interactive online analysis.

One type of analysis now enhanced by the present improvements in computer performance is network analysis. Where many analyses require predefining relationships in the subject data, data mining instead detects those relationships.

There are many techniques to detect relationships. These include dimension reduction. Similarly, there are many algorithms to implement these techniques. For example, dimension reduction may be implemented via a genetic algorithm or in the alternative through matrix operations, specifically matrix reduction algorithms. The implementation of an algorithm may further vary depending on the application. For example, the implementation for analysis of a social network likely would differ from the analysis of a computer network.

In network analysis, a form of data mining, network analysis algorithms may be component algorithms of a larger network algorithm. In these situations, component algorithms are called sub-algorithms. As in with data mining in general, network analysis algorithms typically do not definitively state whether or not a relationship exists. Rather, network analysis reports the likelihood that a relationship exists, and accordingly much of network analysis is inherently statistical in nature. Presently, network analysis is applied to larger and larger amounts of data.

Reporting the aggregated results of a large corpus of data is most easily accomplished via a visual representation. While many visual representations exist, the most typical representation is some variation of a network map. A network map is a graph where each datum subjected to analysis is represented as a node and each relationship is represented as an edge.

Presently, there is no consolidated automated framework to construct complex network analysis applications or to address related issues.

SUMMARY OF THE INVENTION

The embodiments described herein relate to methods and systems to support network analysis application development including but not limited to a framework, development environment, user environment, tools and utilities, their constituent components, and techniques for implementing and utilizing the same.

Embodiments described herein may relate to, but are not limited to, systems and methods applicable to portions of network analysis relating to data management, data analysis, data visualization and data exploration. Specifically, embodiments described herein may relate to, but are not limited to, receiving inputs from files, streams over a network, and various forms of databases and datastores both local and remote; generating a data model potentially covering data from more than one source related via an ontology or other set of relations; storing data both centrally or in distributed fashion; generating data analysis model; and performing data analysis both offline and online.

Regarding offline analysis, embodiments described herein may relate to any processing where a user makes a request and the embodiment returns a response at an unspecified time. Specifically, the offline embodiments include, but are not limited to, generating a data model from subject data in one or more input files, generating a data analysis model corresponding to the data model, storing the subject data into the data analysis model as to comprise a dataset, specifying a data analysis algorithm by pipelining one or more constituent sub-algorithms together, processing at least some data from the dataset with the specified data analysis algorithm, and presenting the output of the data analysis algorithm as final output to the user.

Regarding online analysis, embodiments described herein may relate to any processing where a user makes a request and the embodiment returns a response within a time frame sufficient to motivate a follow-up request, within the same session. Specifically, the online embodiments include, but are not limited to, online analysis on an interactive visualization representation, mapping datasets via ontologies, optimizing processing with a load balancing policy, sharing queries and results from a session both within and without the context of a market transaction, interactively updating a visualization representation, applications to network analysis, and various controls on the visualization representation including but not limited to a zoom and pan widget.

Additionally, embodiments described herein may relate to, but are not limited to, systems and methods relating to creating an extensibility mechanism where artifacts of data management, data analysis, data visualization and data exploration may be exported, shared, reimported, and reused. These include, but are not limited to, sharing datasets, analysis algorithms, queries, and persisted analyses. Furthermore, embodiments described herein may related to exchanging these artifacts in a market including but not limited to selling, renting, auctioning, reverse auctioning, bartering, associating with advertising, and other forms of commercial transactions.

Moreover, embodiments described herein may relate to, but are not limited to, systems and methods relating to utilizing network analysis. Specifically, the application describes end users collaborating in applying network analysis both locally and remotely; within a closed distributed system as well as on the localhost.

BRIEF DESCRIPTION OF THE DRAWINGS

Non-limiting and non-exhaustive examples are described with reference to the following figures. In the figures, the left-most digit(s) of a reference number identifies the Fig. in which the reference number first appears. The use of the same reference numbers in different figures indicates similar or identical items or features.

DETAILED DESCRIPTION

Preliminary Concepts

A. Automated Data Analysis

Figure 1:
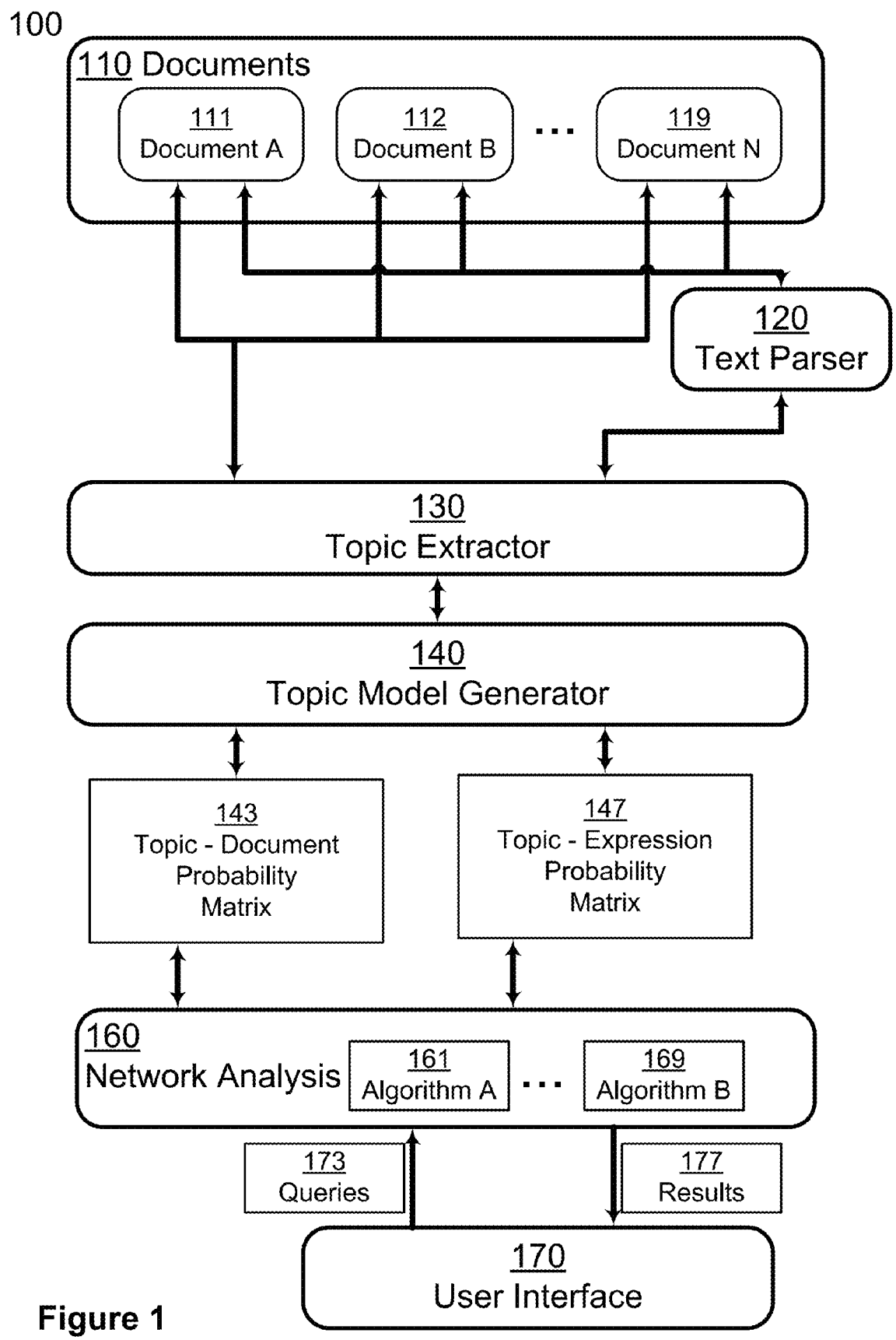
FIG. 1 illustrates a prior art system for performing network analysis.

Data analysis is the inferring or deducing of conclusions from a body of data. A user will enter a set of criteria called a query, which specifies some subset of the data, or alternatively some aggregate of attributes regarding the data as input. One or more data analysis algorithms will take the query criteria and will generate an output called a query result ("result" for short), comprising the data subset of data attribute aggregate specified. For example, if the data to be analyzed is the set {1, 2, 3, 4, 5, 6, 7, 8}, a query comprising a single criterion may be, "all data greater or equal to 6", and the corresponding result would be {6, 7, 8}. More than one criterion may be specified. A second criterion added to the first criterion might be "AND all data less than 8" and the corresponding result would be {6, 7}. The query criteria may relate to data attributes. For example, if the data to be analyzed is {A, B, C, D}, a query might be, "the count of all letters with round sides". Because the letters in the set with round sides are {B, C, D}, and there are three letters in that subset, the result would be 3.

Computer automation is necessary in order for data analysis on large amounts of data to be practical. A user may connect to a computer system, perform data analysis by entering queries, receiving results, and performing other related operations, and then disconnect. The period of time that a user is connected to a computer system for performing data analysis is called a session. When a user is in a session, the user is online. When a user is not in session, the user is offline. A user may go online, enter a computing intensive query, go offline to await the result, and then open a subsequent session to view the result when the computer system has had sufficient time to process the query. In this scenario, the data analysis is said to have been performed offline.

Computer automation allows data analysis to be performed quickly and accurately. This speed allows a user to enter series of queries in which successive results progress towards a more precise result in a single session. In this scenario, the data analysis is said to have been performed online. For example, a user may have a set of data comprising sales of products at particular stores by particular salespeople. The user may first want to know the number of all sales of product X and thus enters a query "the count of all sales of product X". The computer system might return 200. The user may then want to know "the count of all sales of product X in store S." The computer system might return 50. The user may then want to know "the count of all sales of product X in store S by salesperson P." The computer system might return 20. As in this example, where the result of the previous query motivates the user's subsequent query, the data analysis is said to be interactive. Interactive data analysis typically occurs not in the same session, but preferably with real-time or near real-time generation of query results. Otherwise the user will lose his or her train of thought. It is the speed provided by computer automation that the real-time or near real-time query result generation that enables practical interactive data analysis.

Computer automation allows query results to be quickly provided in a variety of data visualizations. In the product/store/salesperson example above, the results could have been provided either as numbers, or alternatively as a bar or pie chart, or some other user specified data visualization. Computer automation also allows the visualization, or the result's underlying query to be modified via a graphical user interface, thereby enhancing the interactive capabilities of online data analysis.

B. Exemplary Constituents of Data Analysis

Automated data analysis requires data management, data analysis, data visualization and data exploration. These four constituents are illustrated in FIG. 1.

Data management is the collecting and storing of data in a form in which a computer system's data analysis algorithms may be eventually brought to bear. The structure of the form the data is stored in is called a data model. In FIG. 1, the data to be operated on are documents 110 comprising N text documents 111, 112 and 119. The documents may be directly acted upon, or may be parsed by text parser 120 to extract out the individual tokens and expressions comprising the text document.

Data analysis is automated by applying one or more data analysis algorithms, each requiring input data in a particular structure and providing output in a particular structure. Accordingly, the data to be analyzed may be taken from the data model and placed in an intermediate form called a data analysis model. The data in the data analysis model may be directly operated upon by one or more data analysis algorithms.

In FIG. 1, the data analysis model to be generated is a data mining topic model. Network analysis will be described in greater detail in the following section, but for the immediate purpose of illustrating data analysis, the topic model is merely an exemplary data analysis model. The topic model is created by a topic extractor 130 which operates directly on the documents 110 or on the tokens and expressions extracted by text parser 120. The topics extracted by topic extractor 130 permit topic model generator 140 to create a topic model comprising topic-document probability matrix 143 and topic-expression probability matrix 147. The matrices 143 and 147 comprising the generated topic model may be operated upon directly by data analysis algorithms. Hence the topic model is the analogous data analysis model in the illustrated network analysis example.

Once the data is in a data analysis model, data analysis may be performed by a data analysis component 160. Here, the data analysis component 160 in the illustrated example is a network analysis module comprising several network analysis algorithms 161 and 169. While FIG. 1 depicts the data analysis component 160 as a single component, a person of ordinary skill will appreciate that the data analysis component 160 may be subdivided into multiple constituent subcomponents according to the requirements of the analysis to be performed or automated.

Data visualization and data exploration is typically provided via user interface 170 which allows queries 173 to be entered and results 177 to be returned for viewing. Data visualization is where a user obtains textual or graphical visual representations of the data via user interface 170. Further, a visual representation may be directly manipulated in user interface 170 to modify: (1) the visual representation, (2) the underlying query, or in some cases (3) the underlying data. While both offline and online data analysis is supported, the combination of manipulating the visual representations with interactive data analysis in user interface 170 constitutes data exploration.

To provide a single point of entry for all operations, data management and other administrative facilities may be provided in user interface 170 in addition to data visualization and exploration functions.

C. Data Mining and Network Analysis

Data mining is a specific form of data analysis which allows a user to determine likely relationships between data. For example, a text document is comprised of tokens. Some of the tokens might be combined into expressions, or alternatively a single token might be an expression. Tokens found may be "physics", "chemistry", "quantum", and "although." A token or expression might be the name of a topic, where a topic is the name of a concept that relates a set of documents. A topic might be the token "physics", and a topic might be the expression "quantum chemistry." The token "although" would not correspond to a topic. A desired relationship to determine is if two text documents discuss the same topic. Two papers, A and B, discussing physics would be considered to have the same topic. Two papers, C and D, discussing chemistry would be considered to have the same topic. A paper B discussing physics and a paper D discussing chemistry might be considered to have the same topic (e.g. if the papers discussed quantum chemistry). Accordingly, whether or not two papers have the same topic is a scaled relationship (e.g. 75% likely that two papers discuss the same topic) rather than a binary relationship (e.g. either two papers discuss the same topic or they don't).

A common way to display the results of network analysis is to display a network map. In a network map, a graph is displayed where the nodes represent individual data points and the edges connecting the nodes represent relationships between the data points. In some network maps, the nodes are placed at a distance to each other proportional to the likelihood they are related. In the above paper/topic example, physics papers A and B would be relatively close together and chemistry papers C and D would be relatively close together. Quantum chemistry papers B and D would be placed closer together compared to the placement of pure physics paper A and pure chemistry paper C.

One way that data mining differs from other types of data analysis is that the structure of the data is not provided a priori, but rather is extracted via algorithms. First candidate topics must be extracted. Then the likelihood that documents relate to a topic must be determined. Note that, not only is the likelihood that two data points are related not absolute due to the nature of the data itself, but also the uncertainty introduced via potential inaccuracies in the algorithms. In network analysis, these likelihoods typically are aggregated into a single probability measure.

Thus in network analysis, typically two kinds of probabilities are measured. The first probability, a topic-expression probability, indicates the likelihood that an expression comprises a topic. For example the tokens "physics" and "chemistry" may be topics. Since some topics comprise more than one token, e.g. the topic "quantum chemistry" comprising the tokens "quantum" and "chemistry", topic probabilities are not just reserved for single tokens, but for expressions of one or more tokens. From the higher topic-expression probabilities, candidate topics may be extracted.

Once the topics have been extracted, a second probability, a topic-document probability is calculated. This is the probability that a document relates to a particular topic.

The topic-expression probabilities and the topic-document probabilities are typically stored in a topic-expression probability matrix 147 and a topic-document probability matrix 149 respectively.

It is important to note that there are many variations of network analysis. In one example, the topics are provided a priori, and the likelihood that an expression relates to a topic, i.e. is a synonym is calculated. Another example is where the probabilities are weighted according to criteria external to direct textual analysis.

Exemplary Hardware Platform for the Distributed Analysis Platform

Figure 2:
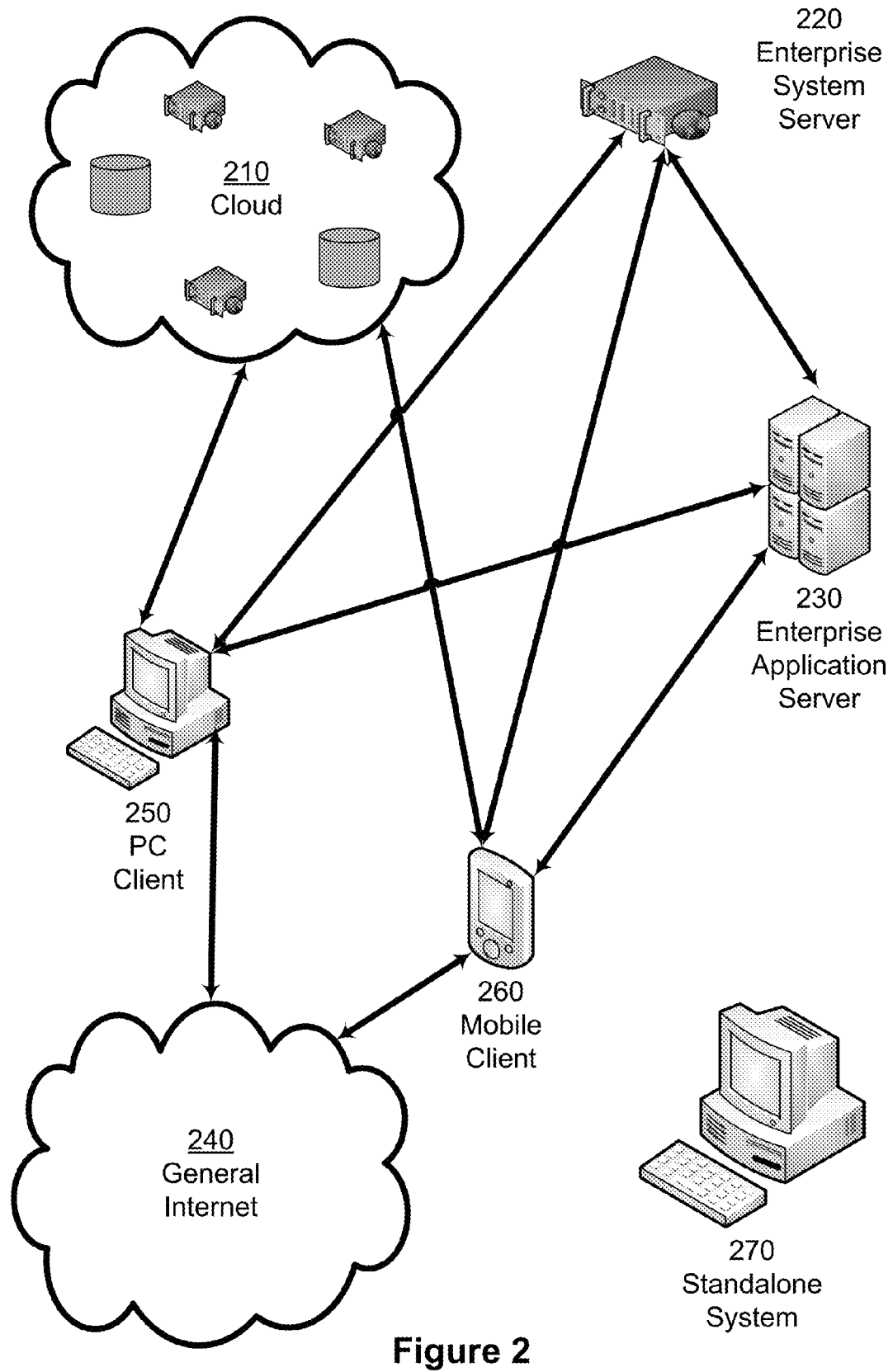
FIG. 2 illustrates an exemplary hardware platform for a distributed framework for performing network analysis.
Figure 3:
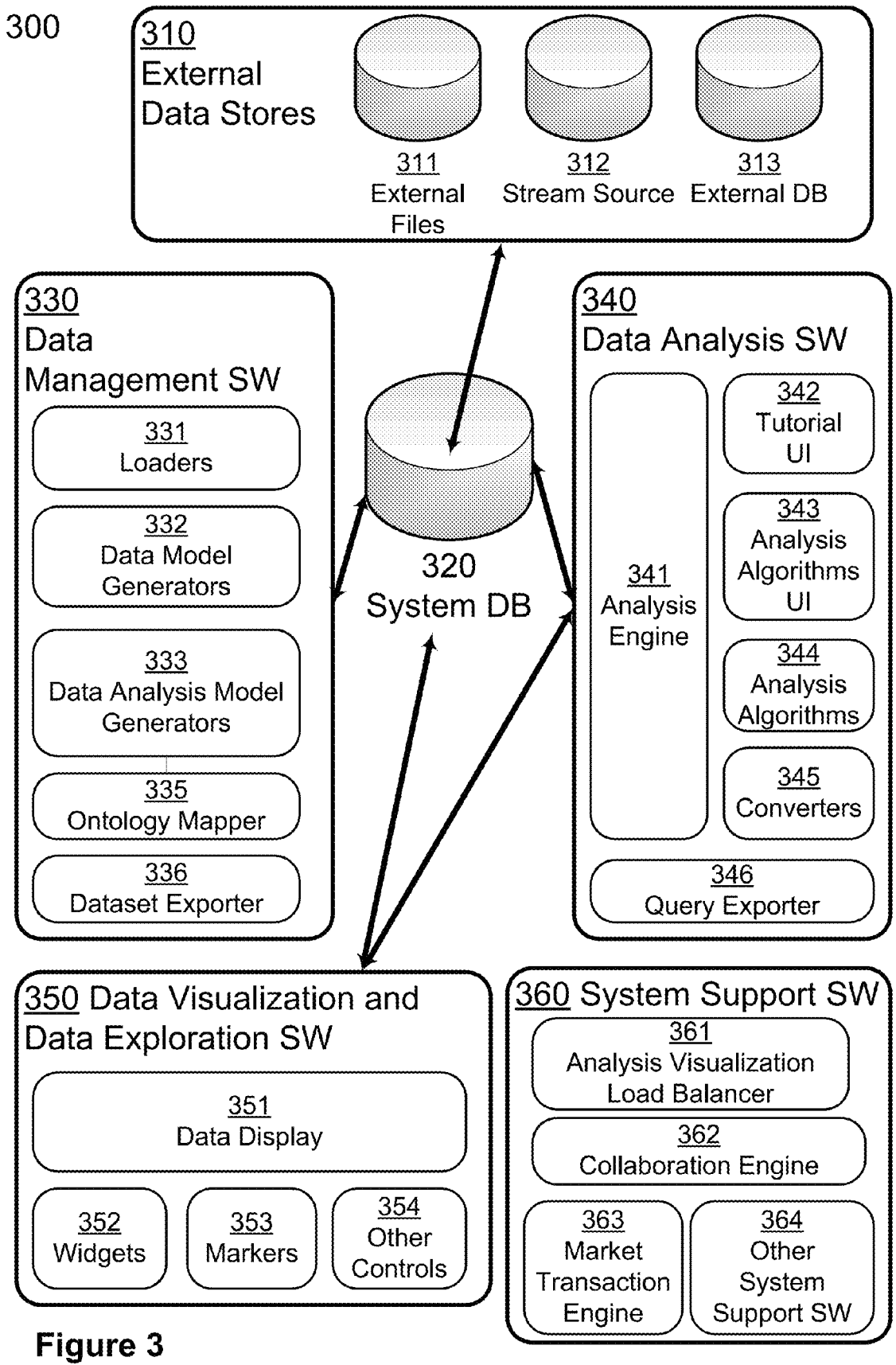
FIG. 3 illustrates an exemplary software platform for a distributed framework for performing network analysis.

A distributed analysis platform comprises a software framework and a hardware platform to perform network analysis, and data analysis in general. The distributed analysis platform may be hosted on a wide range of devices on a network. Alternatively, the distributed nature of the platform does not preclude it from being hosted on a standalone system. FIG. 2 illustrates exemplary hardware platforms for the distributed analysis platform.

A possible hardware host for the distributed analysis platform is on a cloud computing service 210. Cloud computing service 210 contains a large number of servers and other computing assets potentially in geographically disparate locations. These computing assets may be disaggregated into their constituent CPUs, memory, long term storage, and other component computing assets. Accordingly, the distributed analysis platform, when hosted on cloud computing service 210, would have both centralized and distributed data storage on the cloud, accessible via a data access API such as Open Database Connectivity ("ODBC") or ADO.Net™ from Microsoft Corporation™. The application portions of the distributed analysis platform would be hosted on computing assets in the cloud computing service 210 corresponding to an application server.

In the event that the distributed analysis platform is hosted on an ordinary web service or within the LAN of an enterprise, the hardware platform may be hosted on an Enterprise System Server 220 which includes a datastore that may be concurrently accessed, plus data access APIs such as the aforementioned ODBC and ADO.Net™. The Enterprise System Server 220 may host the application portion of the distributed analysis platform, or alternatively may be hosted on Enterprise Application Server 230. Exemplary Enterprise Application Servers include Internet Information Server™ ("IIS") from Microsoft Corporation™ or Apache Web Server, an open source web server. In this way, the distributed analysis platform may run on 2-tier or 3-tier platforms. In fact, for performance reasons, the Enterprise System Server 220 may be preferentially hosted on multiple servers, for example multiple database servers where the data is partitioned.

The distributed analysis platform may access data or application services available on the general Internet 240. For example, a third party may provide data to be aggregated by Enterprise System Server 220 via a data service, or files via a file transfer protocol ("FTP") server, both of which may be available from the general Internet 240. Another example is that the data to be aggregated by Enterprise System Server 220 may be provided via a web service on the general Internet 240. Yet another example is an application service such as a time stamp, or encryption service, available either from a third party, or as a part of the distributed analysis platform, on the general Internet 240.

Clients of the distributed analysis platform may be any network aware device, including but not limited to personal computer ("PC") client 250 and mobile client 260. Personal computer client 250 may include any device of the standard PC architecture, or may include alternative personal computers such as the MacIntosh™ from Apple Computer™, or workstations including but not limited to UNIX workstations. Mobile client 260 may be a web aware cell phone, a netbook, or any other web aware device, including but not limited to any device that may host a web browser.

The distributed analysis platform alternatively need not be distributed. Where the workload is small enough, it may run on standalone system 270, which may be a powerful personal computer. Alternatively, the system may run on a mainframe or powerful UNIX workstation.

Exemplary Software Platform for the Distributed Analysis Platform

The preceding section described hosting requirements for database servers and application servers. More specifically, the software platform for the distributed analysis platform comprises: specific software to enable external data storage 310; data storage for the distributed analysis platform's system 320; software for data management functions 330 including but not limited to loading model generation, and data export; software to perform both online and offline data analysis on the stored data 340; software for data visualization and data exploration functions 350 of analyzed data; and system support utility software 360 which enables the distributed analysis platform to be performant and to interface with other systems. The following sections will describe the exemplary software platform 300 in more detail.

The distributed analysis platform will perform analysis on data stored external to the system. The external data stores 310 may include but not limited to documents to be analyzed, often in the form of files 311. Such files may be placed on a file server or network directory.

An external data store may come in the form of a data stream source 312. Data stream source 312 could provide data via a web service. Common examples are RSS, Atom, and OAI. Data in a data stream need not be textual in nature. Data stream sources could contain multimedia data, or alternatively tagged textual data, or data with metadata. The data may also be compressed or encrypted.

An external data store 310 may include data stored in an external database 313. External database 313 may be a relational database management system ("RDBMS"), object database management system ("ODBMS"), or object relational database management system ("ORDBMS"). To support cloud computing and other considerations, the external database 313 may alternatively be a columnar database.

A user can specify if the external database 313 should be imported into system database 320 or if only references to the external database 313 should be stored. In this way, data external to the system database 320 can be used in a dataset. If only references are saved, then storage space is saved. However, while the system database 320 is guaranteed to have 100% up-time, the external database 313 has no such guarantee. Accordingly, the distributed analysis platform may provide logic to handle cases where external databases 313 are not up and running. For example, if the external database 313 does not have a statistically significant amount of data, or if a query applied does not require the external database, then a query may proceed after notifying a user that the external database 313 is down. Alternatively, if the external database 313 is statistically significant to a query, the distributed platform may attempt to determine as much information as possible from the references stored in the system database 320. However, ultimately, if the external database 313 is critical to proper operation, then an error message must be provided to the user.

External data stores 310 may interface with system database 320 via a software driver or plug-in (not shown) that transforms the data into a format compatible with the system database 320. The external data stores 310 may be accessed directly or stored in system database 320. Accordingly, the external data sources 310 are not limited to the aforementioned embodiments, but rather include any data source where the data may be extracted and transformed into a format compatible with the system database 320.

System database 320 contains either data, or reference to the data, to be analyzed by the distributed analysis platform. Due to the large storage of some data corpuses, it may be impractical to store a duplicate copy in the system database 320. In such situations, the system database will store a reference to the actual storage location of the data in one of the external data stores 310. Alternatively, for relatively small datasets, the system database 320 will store a copy of the data corpus to be analyzed.

The system database 320 also preferentially stores any session state or system state as the system is used. This includes but is not limited to metadata about the data to be analyzed and metadata about reports and analysis run against the data. It may also include static and semi-static data including but not limited to user account information and billing. At times the system database 320 may include dynamic data including but not limited to temporary or "scratch" data, such as working tables to create Cartesian joins.

An important set of data stored in system database 320 includes data enabling the addition of custom tags to stored data and data for data provenance. Such data allows for customization of data sets to be analyzed by different users and also allows for an audit trail of actions and analyses performed during the loading and use of the data. Specifically, all data operations are logged and tagged. Tags for each data item include but are not limited to: a list of the changes, a datetime stamp when it was imported, and an identifier of what algorithm generated it. The log and tag data is preferentially stored in the system database so that the provenance of each data item is easily accessible. The provenance data may also be used to specify change sets to provide undo/redo capability.

As with the external databases 313, the system database 320 may be in the form of an RDBMS, ODBMS, ORDBMS, or columnar database. In general, the system database 320 may be in any form that permits efficient and reliable data retrieval, including custom data engines based on custom data structures.

Data management software 330 includes: (1) software modules to load data 331 into the system database 320, (2) software modules to generate data models 332, (3) software modules to generate data analysis models 333, (4) software modules to map ontologies or other reference systems to taxonomies 335 onto the data to be analyzed, and (5) software modules to export data 336, preferably in the form of a dataset. In general, the data management software 330 supports the data management functions described in detail with reference to FIG. 5.

Data loaders 331 are responsible for loading data from the external data stores 310 into the system database 320. The loaders 331 perform extract, transform and loading operations. The extract portion includes tokenizing and parsing data in external data stores 310. The transformation portion includes not only conforming extracted data into a compatible format, but also may include inserting metadata from external sources or calculated during extraction. The loading operation is the actual persisting of the data, or references of the data into the system database 320. Data loaders 331 are also responsible for generating error reports, and may preferentially provide debugging information for failed loading operations.

Data analysis requires determining the structure of the data to be analyzed. This structural data is stored as a data model. The loaded data may be analyzed for structure either during load time or after the data has been loaded or in some combination of the two. Data model generators 332 perform operations to determine what kinds of data are to be analyzed, how the data is organized, and the interrelationships between the data. Preferentially, the structure is stored as a series of entities, attributes about the entities, and relationships between the entities. Since this structure closely matches a relational database, the data model may be stored in a format compatible with a relational database or any other database supporting entity relationships.

Once the data structure has been determined by the data model generators 332, the data must be transformed into a structure that may be analyzed. The data analysis model generators 333 perform this transformation. Data analysis model generation by the data analysis model generators 333 may include, but not be limited to statistical analysis, and generation of intermediate data forms stored in the system database 320.

The structure of the data to be analyzed may also be affirmatively provided in an external data source. An ontology is one form of this structural data. Ontologies describe entities and other semantic information about data sources. Ontologies are particularly useful for mapping the semantics of the structure of one set of data to the semantics of the structure of another set of data. For example, one set of data may have an attribute called "cost" and a second set of data may have an attribute called "price." An ontology may indicate that "cost" and "price" are equivalent. Ontology mappings need not be one-to-one. For example, one set of data may have an attribute called "name" but a second set of data may have two attributes called "first name" and "last name". Accordingly, one set of data may store "Jim Smith" for "name" but the second set of data may store "Jim" for "first name" and "Smith" for "second name."

As can be seen from the foregoing, much effort is expended to place a set of data into a form that may be subjected to data analysis. A set of data associated with a particular data model and a particular data analysis model is called a dataset. Often datasets are specific to users. In order to share a dataset, it may be desirable to export the dataset. A dataset exporter 336 performs this function. The dataset exporter 336 may simply output a dataset for backup purposes. Alternatively, the dataset exporter 336 may store encryption information or may compress some or all of the dataset. Exported datasets may be sold and resold as part of business transactions. Particularly useful datasets may command high demand in information markets.

The data from the external data stores 310 must be loaded into the system database 320 and then operated on. The role of the data analysis software 340 includes, but is not limited to: (1) loading the data into the system database 320, (2) creating a data model (e.g. a schema) and a data analysis model, (3) performing data analysis operations on the data analysis model and (4) providing entry points for the data in the system database 320 to interface with other systems, other data, or other metadata. The core of the data analysis software 340 is the data analysis engine 341. In support of the data analysis engine 341 are a tutorial user interface ("UI") 342 to show how to use the engine 341, algorithm specific UI 343 for each of the analysis algorithms 344 that may potentially be used by data analysis engine 341, converters 345 to make the output of one of the analysis algorithms 343 compatible with the input of another, and a query exporter 346 which exports not only query criteria but also query result sets. In general, the data analysis software 340 performs the data analysis functions described in detail with reference to FIG. 7.

The data analysis engine 341 applies one or more data analysis algorithms 344 to the data analysis model generated by data analysis model generators 333 and stored in system database 320. The data analysis engine 341 may use the output of one of the data analysis algorithms 344 as the input of another of the data analysis algorithms 344, in a process called pipelining. Thus, the data analysis algorithms 344 become sub-algorithms of a larger data analysis algorithm. Data analysis engine 341 is not limited to pipelining. Other functions, including but not limited to statistical calculations and data aggregation may also be performed by the data analysis engine 341.

Data analysis typically requires specialized information. Tutorial UI 342 provides an interactive tutorial on how to use the data analysis engine 341 and the distributed analysis platform at large. For each operation available in the distributed analysis platform, the tutorial UI 342 has a set of operation instructions that potentially include, but are not limited to background information, context of the operation within the larger data analysis operation, and instructions on how to use the operation. Because each user differs in the amount of background information he or she possesses, the tutorial UI 342 provides different levels of information, and allows users to click on links or to navigate through menus to greater and greater levels of detail. The tutorial UI 342 may also be "conversational"; that is, the tutorial UI 342 may walk the user step by step of each operation, asking questions and providing answers in a natural language or pseudo-natural language format. The pseudo-natural language format may include predetermined or "canned" text that simulates conversation, so that the distributed an analysis platform needs not generate natural language responses in real time.

In addition to providing a tutorial UI 342 for the end-to-end operation of the data analysis engine 341 and the system at large, each analysis algorithm 344 to be pipelined may have its own analysis algorithm UI 343. The analysis algorithm UI 343 may provide information about what inputs and outputs are to be expected, formats required for input, format of output, and a description of the analysis algorithm to be performed. The analysis algorithm UI 343 may be merely functional, or may also provide a conversation UI as per the tutorial UI 342 described above. The tutorial UI 342 may delegate tutorial or information operations of individual algorithms 344 to the analysis algorithm UI 343. Specifically, when a user clicks on a link or selects some other control requesting more information about an individual analysis algorithm 344, the tutorial UI 342 may invoke the corresponding analysis algorithm UI 343, and may receive user input and events from the analysis algorithm UI 343.

The analysis algorithms 344 are at the heart of the data analysis software 340. There are many well known data analysis algorithms, and there are many well known data layout presentation algorithms such as Distributed Recursive Graph Layout ("DrL") and its variations. Data analysis algorithms 344 may include custom algorithms for data analysis, including network analysis. Data analysis algorithms 344 may include operations that do not necessarily perform analysis on the data analysis model stored in system database 320 directly but may perform supplementary statistical operations or other related functions in support of data analysis. Accordingly, a data analysis algorithm is potentially any algorithm that performs some operation on the data analysis model or provides intermediate functions to enable operations on the data analysis model.

Special algorithms to support the operation of data analysis algorithms are converters 345. Data analysis engine 341 determines whether the output of a data analysis algorithm 344 is compatible with the input of another data analysis algorithm 344. If it is not compatible, data analysis engine 341 automatically determine the output and input formats, and selects a converter 345 that is able to convert the output format into a compatible input format. The converter 345 need not convert the output of a data analysis algorithm 344 to the precise format expected by the input of the data analysis algorithm to be pipelined with. For example, an input may preferentially require a comma separated variable file but may accept a simple text file. If a converter to a comma separated variable file is not available, then a converter to a text file may be selected by the data analysis engine 341 instead. Converters 345 can also apply to the structure of the data output as well. If necessary, the data analysis engine 341 may select multiple converters 345 to change the output format into the correct input format. For example, a first converter may change text output to fixed position format, and the fixed position format then converted to comma separated variable. Thus converters 345 may potentially be pipelined as well.

Queries can be performed against the data analysis model either by applying data analysis algorithms 344 via the data analysis engine 341, or by refining the data analysis via the data visualization and data exploration software 350 or in combination with each other in various stages. This state is stored either in the system database 320 or alternatively persisted locally on the client 250 or 260. The state to be able to reproduce a query, any associated reporting, or the query result may be exported by the query exporter 346. The query exporter 346 may export a backup, or may apply encryption or compression to some or all of the query, supporting data, and query result. Thus a user, who goes through the effort to (1) develop a detailed pipeline of algorithms, (2) apply converters, (3) create a query result, and (4) develop complex reports, may not only save this work but also share the work with others. Accordingly, the persisted queries, supporting data, and query result may be distributed and sold over the information market.

Data visualization and data exploration software 350 allows the result of a data analysis to be viewed and manipulated. The manipulation may include modifying how the query result is graphically presented, modifying the underlying result data, or even modifying the underlying query and data analysis algorithms itself. Accordingly, any state of the graphical presentation of the data visualization software 350 or of the manipulations made with the data exploration software 350 may be persisted in system database 320 and exported via query exporter 346. Data visualization and data exploration may be performed on either offline or online data analysis results. Data exploration is particularly powerful when performed online as the user may perform modifications based on questions raised by previous modifications. In general, the data visualization and data exploration software 350 performs the data analysis functions described in detail with reference to FIG. 10.

Data is visualized or graphically presented on data display 351. Data display 351 provides one or more windows in which to show either a predetermined or selected graphical presentation. For example, data display may show a simple text list. By way of another example, the data display may show some variation of a network map.

The user may manipulate the graphical presentation as shown on the data display 351 with widgets 352, markers 353, and other controls 354. Widgets 352 are software controls with a UI, either via the data display 351 or via a separate display, that may manipulate the underlying result data, or even modify the underlying query and data analysis algorithms itself. A special form of widget is a gadget. Specifically a gadget is a widget without UI.

Markers 353 are static or dynamic controls that allow particular subsets of data to be supplemented with additional graphical information not directly provided by the data analysis. For example a user may mark the data with a marker 353 to highlight a particular subset of data, perhaps with "pushpin" flags onto the UI to indicate some particular importance. In another example, a user may add comments or notes to the data via markers 353. Thus markers 353, unlike widgets 352, change the graphical presentation on data display 351 without manipulating the underlying result data, underlying query or data analysis algorithms. They provide simple visual indicators to associate with the data.

Manipulation of the data display is not limited to widgets/gadgets 352 or markers 353. Additional controls 354 may be applied to the data display and to the UI in general for ease of use. Additional controls 354 may include but are not limited to buttons, menus, pop up windows, scroll bars, drop down boxes, combo boxes, to name common examples. Accordingly, additional controls 354 are any controls that enable the user to interact with the data visualization and data exploration UI to view, access, and navigate the data display 351, widgets/gadgets 352, and markers 353.

The distributed analysis platform supports function not directly related to data management, data analysis, data visualization, and data exploration. System support software 360 includes, but is not limited to system utilities to manage the distributed analysis platform, to provide performance optimizations, and to enable interaction with systems other than the distributed analysis platform. Specifically, system support software 360 comprises an analysis visualization load balancer 361, collaboration engine 362, market transaction engine 363, and other system support software 364. The analysis visualization load balancer 361 is discussed further in reference to FIG. 11.

The analysis visualization load balancer 361 enables the processing load required by data visualization and data exploration to be distributed between the client and the server. When the data visualization and data exploration software 350 render the graphical presentation on data display 351, the graphical presentation is subdivided into layers, each layer containing some subset of the graphical presentation. Analysis visualization load balancer will then dispatch the task of calculating some of the layers to either the client processors or the server processors according to a policy.

There is a wide range of policies that may be applied to analysis visualization load balancer 361. An example of a policy is to provide a simple static split of processing where a predetermined percentage of visualization processing is done on server 230 (see FIG. 2). Another example of a policy is to receive notifications of the amount of processing available on the client, then to dynamically determine load every time a graphical presentation is generated, thereby uploading as much processing to the client as possible. A policy may be predetermined, or may vary according to a rules engine. The operation of the analysis visualization load balancer is described in detail with reference to FIG. 11.

Collaboration engine 362 allows multiple clients to perform analysis on the same dataset. The operation of collaboration engine 362 is described in detail with reference to FIG. 12. Specifically, the collaboration engine 362 includes serialization software to guarantee data visualization and data exploration requests arrive serially. The collaboration engine 362 also includes a transaction engine to ensure that data requests, in particular those involving modifying the underlying data or underlying query, are atomic, consistent, isolated, and durable ("ACID"). By serializing data visualization and data exploration requests and transacting these requests per the ACID properties, responses for multiple users are coherent and the underlying dataset will not become corrupted.

The market transaction engine 363 enables exchange of datasets and queries. Datasets and queries may be persisted to the system database 320 via dataset exporter 336 and query exporter 346 respectively. While datasets and queries may be sold as standalone files, often it is easier simply to leave the persisted dataset or query on system database 320 and to sell access to the dataset or query.

In general, datasets and queries exported by dataset exporter 336 and query exporter 346 respectively may simply be in the form of export references to data or instructions on how to reproduce a dataset or query. This is possible since the data to be analyzed is stored in a central, globally accessible system database 320. Accordingly, datasets and queries may be shared without having to package the underlying data. This model enables a high degree of sharing appropriate for a marketplace.

The market transaction engine 363 tracks which users may access which dataset or query via an access control list. The market transaction engine 363 includes a public key encryption component which controls access to a particular dataset or query via an access control list or similar mechanism. The public key server maintains encryption keys specific to datasets and queries as well as for users. Finally the market transaction engine includes a billing/fulfillment component where payment is received, the encryption component generates an access key for the dataset or query, an URL is generated, and served to the paying user. The market transaction engine may further comprise a web page where users may post datasets and queries along with descriptive commentary. Users may post ratings, reviews, or other commentary of the datasets or queries. The web page may provide a UI for purchasing datasets or queries.

Other system support software 364 includes any software necessary to support operation of the distributed application platform. This includes, but is not limited to, administrative utilities such as account management, security management, performance management, auditing, billing management, and the like. System support software 364 may include server side functionality to provide a robust and reliable server. This includes, but is not limited to, security software, load-balancing software for servers, failover clusters for servers, and a global system clock. For example, a load balancer may include a request dispatcher that serves the requests to multiple application servers in round robin order. In this way, processing is evenly distributed across multiple servers enabling scalability. Another example is a failover cluster where multiple application servers or multiple database servers operate in parallel redundantly. Where an application server crashes, or a database server crashes, the failover cluster will turn processing over to the redundant backup server thus ensuring system uptime.

Extensibility Model

In general, the distributed application platform is extensible in the external data it uses, in the data models, data analysis models, and data analysis algorithms, and in its queries. The system database 320 has an architecture support loaders 331 where different kinds of data may be referenced by the system database 320 and alternatively data imported into the system database 320. Datasets, data models and data analysis models are exportable via dataset exporter 336. Third party analysis algorithms 344 and converters 345 may be added at any time. Queries along with display parameters of a particular graphical presentation are exportable via query exporter 346. Because of these entry points into the system, the distributed application platform may provide an application programming interface ("API") to allow further customization of the distributed analysis platform.

Overview of Operation

Figure 4:
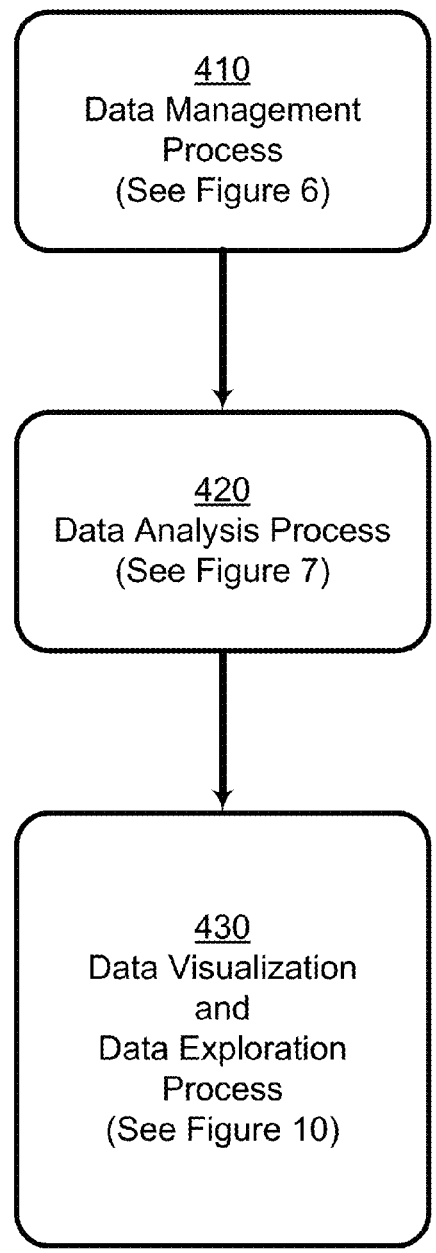
FIG. 4 illustrates a top level flowchart of an exemplary operation of a distributed framework for performing network analysis comprising at least data management, data analysis, and data visualization and data exploration processes.

FIG. 4 illustrates the method of operation of the distributed application platform. Specifically, a user creates or specifies one or more datasets to be analyzed, and creates a data analysis model in a data management process 410. The data management process is described in detail with reference to FIG. 6. The user then performs data analysis by applying data analysis algorithms to the data analysis model in data analysis process 420. The data analysis process is described in further detail with reference to FIG. 7. Finally, the user may perform data visualization and data exploration either online or offline in the data visualization and data exploration process 430. The data visualization and data exploration process is described in detail with reference to FIG. 10.

Figure 5A:
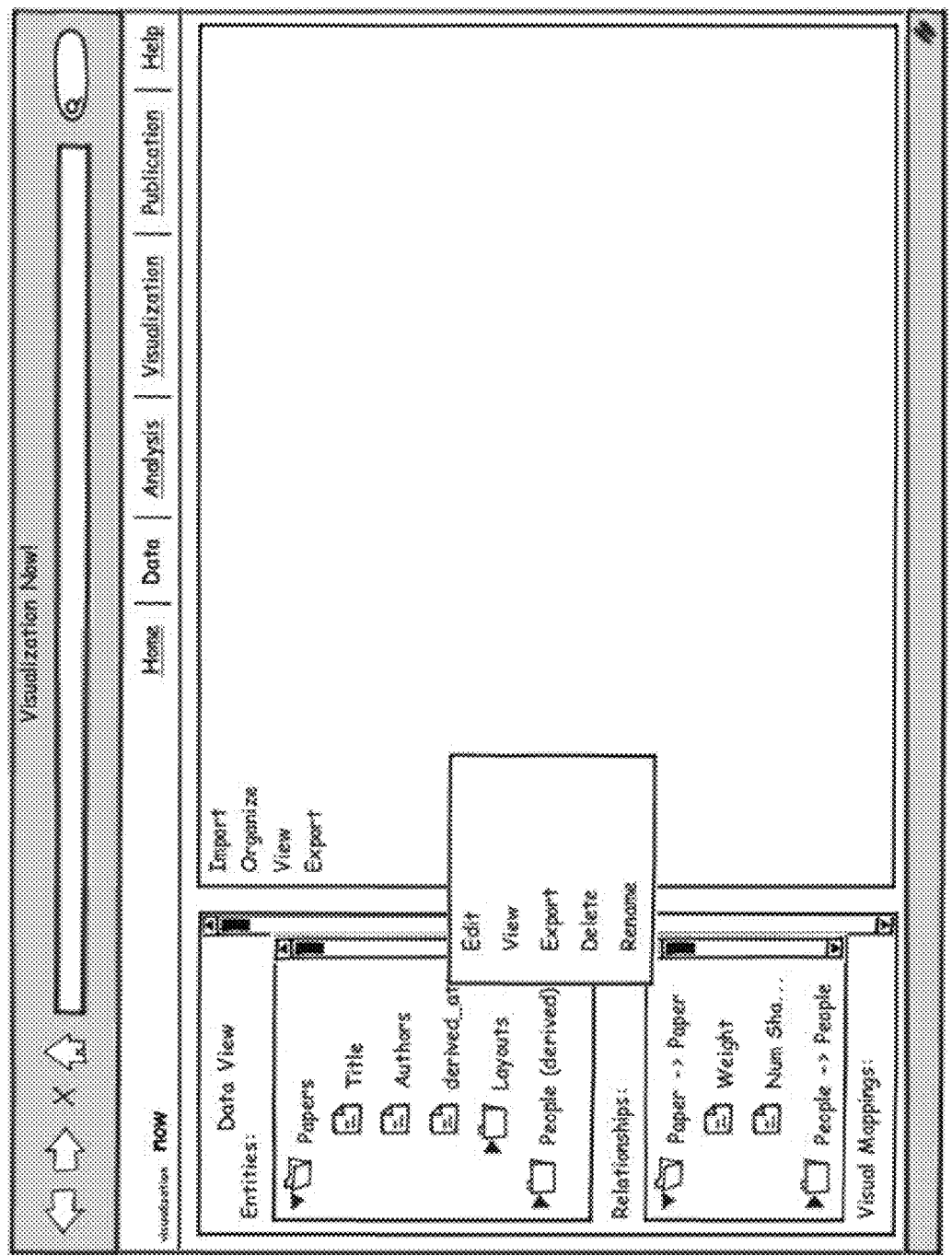
FIGS. 5A, 5B and 5C illustrate exemplary user interfaces for performing data management, data analysis, and data visualization.
Figure 5B:
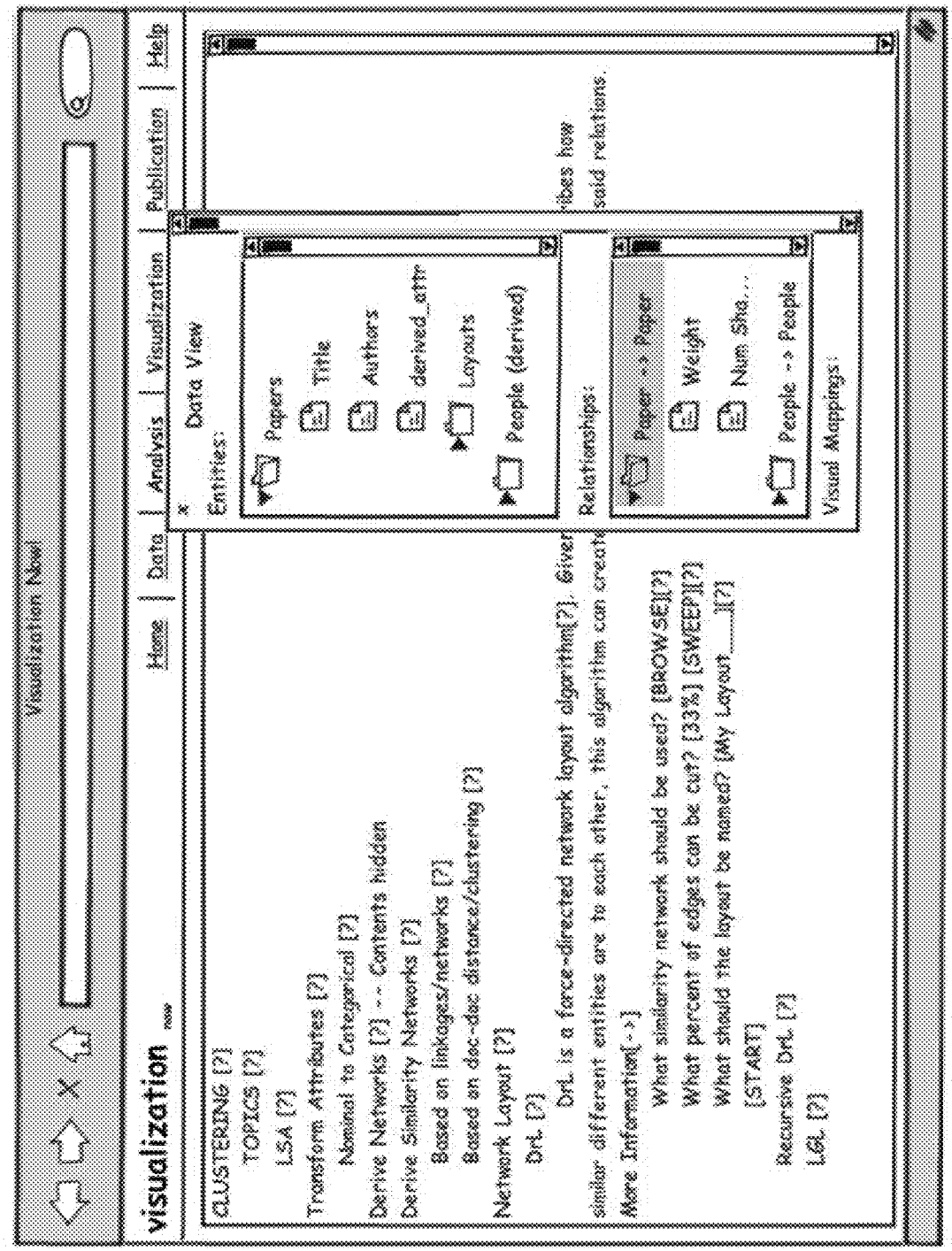
Figure 5C:
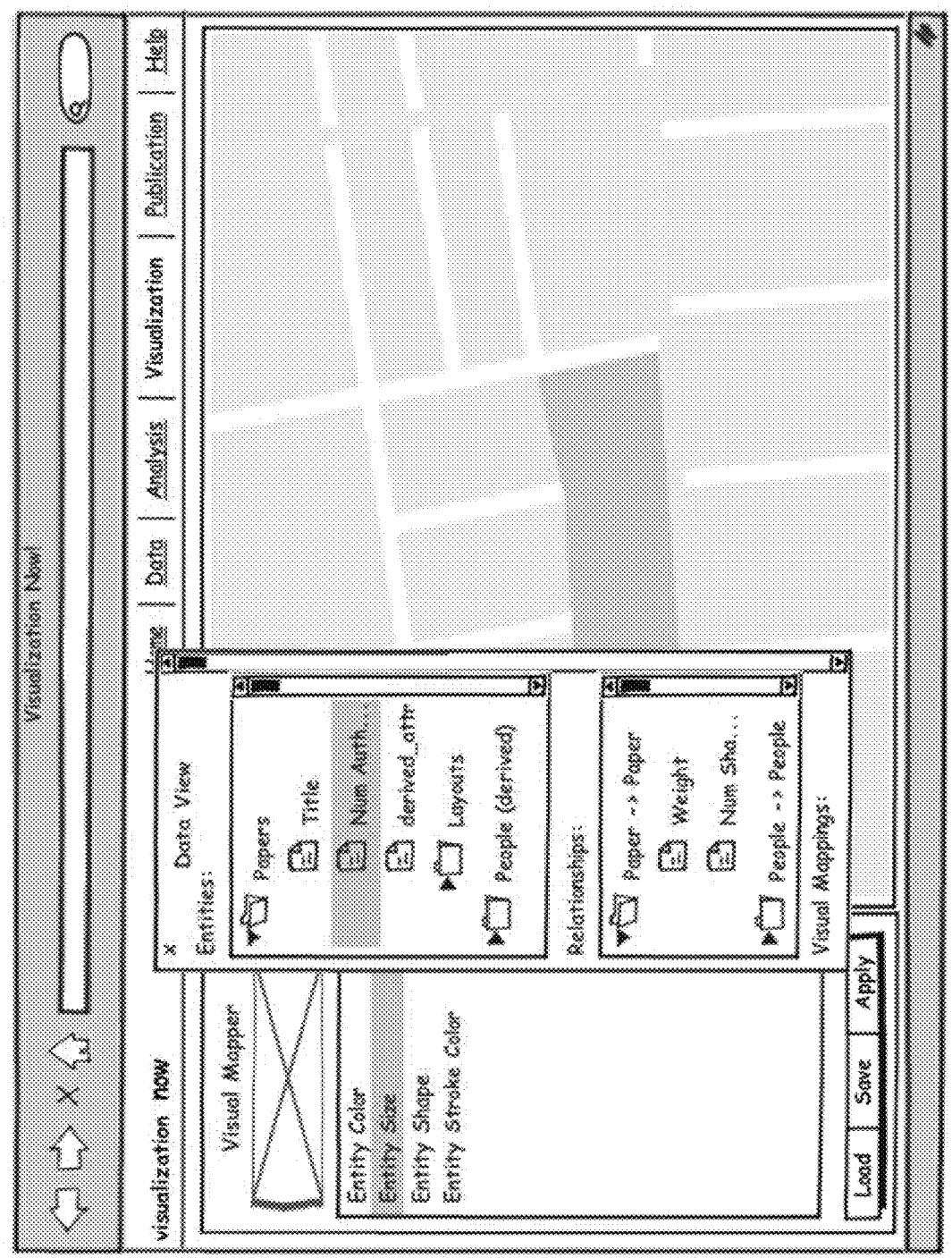

FIGS. 5A, 5B, and 5C provide exemplary UI for the data management process, data analysis process, and the data visualization process, respectively. The exemplary UI in FIGS. 5A, 5B, and 5C is preferentially hosted in a web browser. Other controls such as hyperlinks and navigation buttons from the web browser and underlying content are available.

In FIG. 5A, the exemplary UI for data management shows that the data model has already been imported. List boxes on the left show entities "Papers" and "People". The "Papers" entity shows attributes "Title", "Authors", and a computer generated attribute called "derived_attributes." The "Papers" entity shows a folder called "Layouts" referring to prior data visualization metadata that might be reused. A context menu allowing the attributes to be edited, viewed, exported, deleted or renamed is available.

In FIG. 5B, the exemplary UI for data analysis shows a tree view of potential data analysis algorithms that may be brought to bear on the data model. For example, under "Network Layout", DrL is listed as a candidate algorithm. Key terms have a "[?]" link that will provide help UI to describe the term and provide contextual information. A data view window serves to provide information about the underlying data.

In FIG. 5C, the exemplary UI for data visualization shows a graphical representation of the data in the right pane. In the left pane display parameters such as "Entity color", "Entity size", "Entity shape", "Entity stroke color", may be modified. As with the data analysis exemplary UI, a data view window serves to provide information about the underlying data.

Data Management

Figure 6:
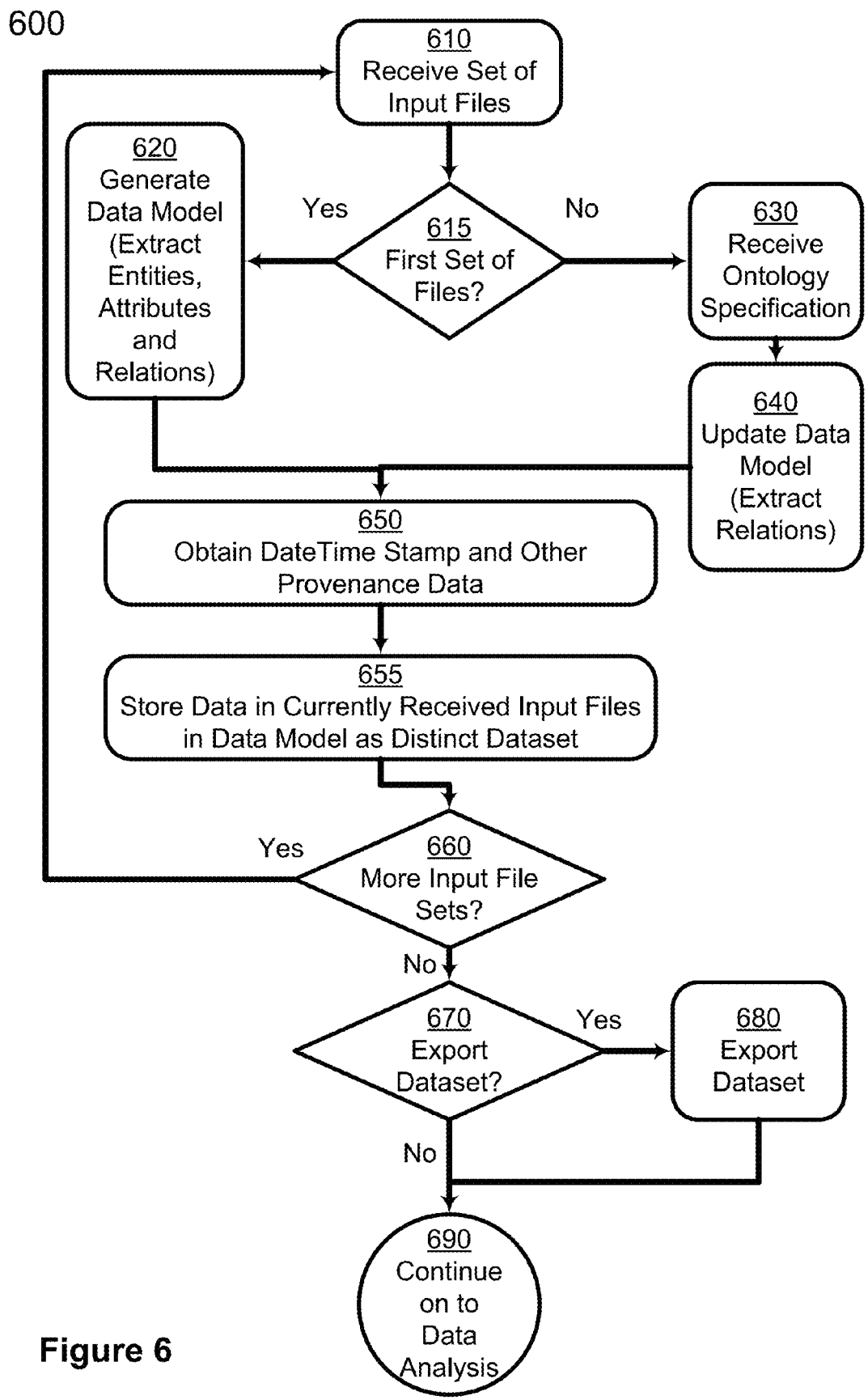
FIG. 6 illustrates a flowchart of an exemplary data management process.

The goal of the data management process is to import external data, preferentially in a set of files or remote database connections, create one or more datasets, and create a single consistent data model. Where there is more than one dataset, information from an ontology creates relations which define how entities and entity attributes from two different datasets map to each other. When a dataset or a data model is complete, the data management process also provides for exporting. FIG. 6 provides a flowchart 600 that is an embodiment of the data management process 410.

In 610, the data management process receives external data, usually in the form of files. However, the external data may also come in the form of streams, external databases, or some combination thereof.

The external data is to have some structure. Structure is a set of ascertainable entities, attributes of entities, and relationships between the entities. Specifically the structure is that of normalizing raw data into a relational database. The only requirement is that the individual portions of data comprising the external data have the same entity names, entity fields, and cardinality of relationships between the entities.

For example, a highly structured set of input files might be a set of abstracts of technical papers to be published. Each technical paper may be expected to have a title, several authors, a date, and a short abstract. Here an entity may be "technical paper" and the attributes of the "technical paper" entity" may be "title", "date", and "abstract". Because a paper may have several authors, there may be another entity called "author" with an attribute called "author name." The relationship between the "author" and "technical paper" entities is that an author may have written several different technical papers and a technical paper may have been written by multiple authors, i.e. a many-to-many relationship. In this case, a relationship called "author-paper cross reference" that cross references author and technical paper may be made. Thus the relationship between "author" and "author-paper cross reference" is one-to-many and the relationship between "technical paper" and "author-paper cross reference" is one-to-many as well. Thus the input files have been normalized into three entities: "technical paper", "author", and "author-paper cross reference". Relationships, in some embodiments may be stored in a table and thereby may become a meta-entity.

Another example with relatively little structure is a set of the technical papers itself, where the bulk of the data is the text of the paper, each paper having different sections and widely varying text. While the structure may be similar to the previous example of abstracts, additional attributes such as might also be generated. Yet another example might be free-text conversations between humans which have been transformed into digital text.

If the data management process determines that the set of files being processed is the first set of files 615, then an initial data model is generated 620. A data model is a schema that describes what each of the files in a set of files constitutes, and potentially what the subdivisions of each file in the set of files is. An analogous process may be performed for a set of external streams or records in an external database. Accordingly, the structure of the files in the set of files is ascertained; that is, entities, attributes, and relationships between the entities are identified. In its simplest form, the only entity might be a file. For example, each file might be treated as an entity. Optionally, the files may be parsed so that headings and divisions in the file such as chapters and chapter sections may be detected, although generally parsing is reserved for the data analysis process 420. Alternatively, the user may affirmatively provide a structure in the form of a file, or by entering into the data management process directly via a utility. When all entities, attributes, and relationships between the entities have been determined, a first data model is complete.

It is important to reiterate that a data model is distinct from a data analysis model where the data is transformed into a new structure that aids in data analysis. Rather the data model provides information on how to locate data in the input set of files so that it may be selectively extracted, transformed, and loaded into a data analysis model. Once a data model has been created, the data in the input files may be stored in the data model. Accordingly, the data may be searched, added to, edited, renamed, or deleted.

If the data management process determines that the set of files being processed is a subsequent set of files 615, then the data management process will expect an ontology to be input in 630. The ontology may be a file or a stream that explicitly specifies what entities, attributes, and relations are in the new set of files. In this case, the data management process updates the data model in 640 by creating new entities for the data model, but creating relationships to relate entities in the original data model to new entities from the subsequent set of files. For example, an original set of input files may have an entity called "technical paper", and a subsequent set of input files may have an entity called "academic paper." A relationship generated by an ontology stating that the two are equivalent may be to generate a mapping between the two entities.

As described above, an ontology may allow multiple datasets to be supported in the same data model. One way of supporting multiple datasets to avoid ambiguity is to apply a namespace to each dataset. For example, if dataset "MyDataset" has an entity called "document" and dataset "YourDataset" also has an entity called "document", the names may be disambiguated by calling the two entities "MyDataset.document" and "YourDataset.document" respectively.

Once a set of input files or a set of external data has been received, and a data model is complete, the data management process will generate and store provenance in data 650. Provenance data is data that tracks indicia of how and when the dataset was created, and includes, but is not limited to, timestamp and identity of the user who created the dataset. This data is used to audit dataset generation, and to guarantee that if the dataset were to be regenerated, it would be the exact same dataset. For example, at time T1, data imported from a relational database may have ten technical papers. But at time T2, the relational database may have fourteen technical papers, a function of new papers having been added. By storing the datetime stamp of when the dataset was created, a process to regenerate the dataset would take care only to import records up until time T1, thus not importing the four technical papers added between time T1 and time T2.

The data model is then created as a set of entities, attributes, and relations and the external data imported in 655. The provenance data and potentially other metadata are also stored. This instance constitutes a distinct dataset upon which a data analysis model may be built and which may be exported independently of any other dataset.

If the data management process determines that there are more sets of input files or sets of external data to import, the process returns to 610.

At this point, each of the datasets, singly or in combination, with or without the associated data model, and along with the provenance data and associated metadata, may be exported. If the user chooses to do so in 670, then the dataset is exported in 680. Preferentially the dataset is stored as a set of tables in a relational database. The tables of the data model along with the imported data may be exported in binary format associated with the RDBMS. Alternatively the data may be exported as a text XML file or other formats. The exported data may be encrypted and may be compressed.

In 690, the data model is ready to be used as input to generate a data analysis model by the data analysis process 420. While the export process 680 is shown as prior to the data analysis process, the export process 680 may be done at any time after 655 where a distinct dataset has been imported.

Data Analysis

After the data management process 410, operation proceeds to data analysis process 420. The data analysis process consists of creating a data analysis model, identifying a set of analysis algorithms which will become analysis sub-algorithms to apply to the data analysis model, identifying how to pipeline the analysis sub-algorithms together into a larger end-to-end algorithm, and then applying the pipelined sub-algorithms to the data analysis model.

Figure 7:
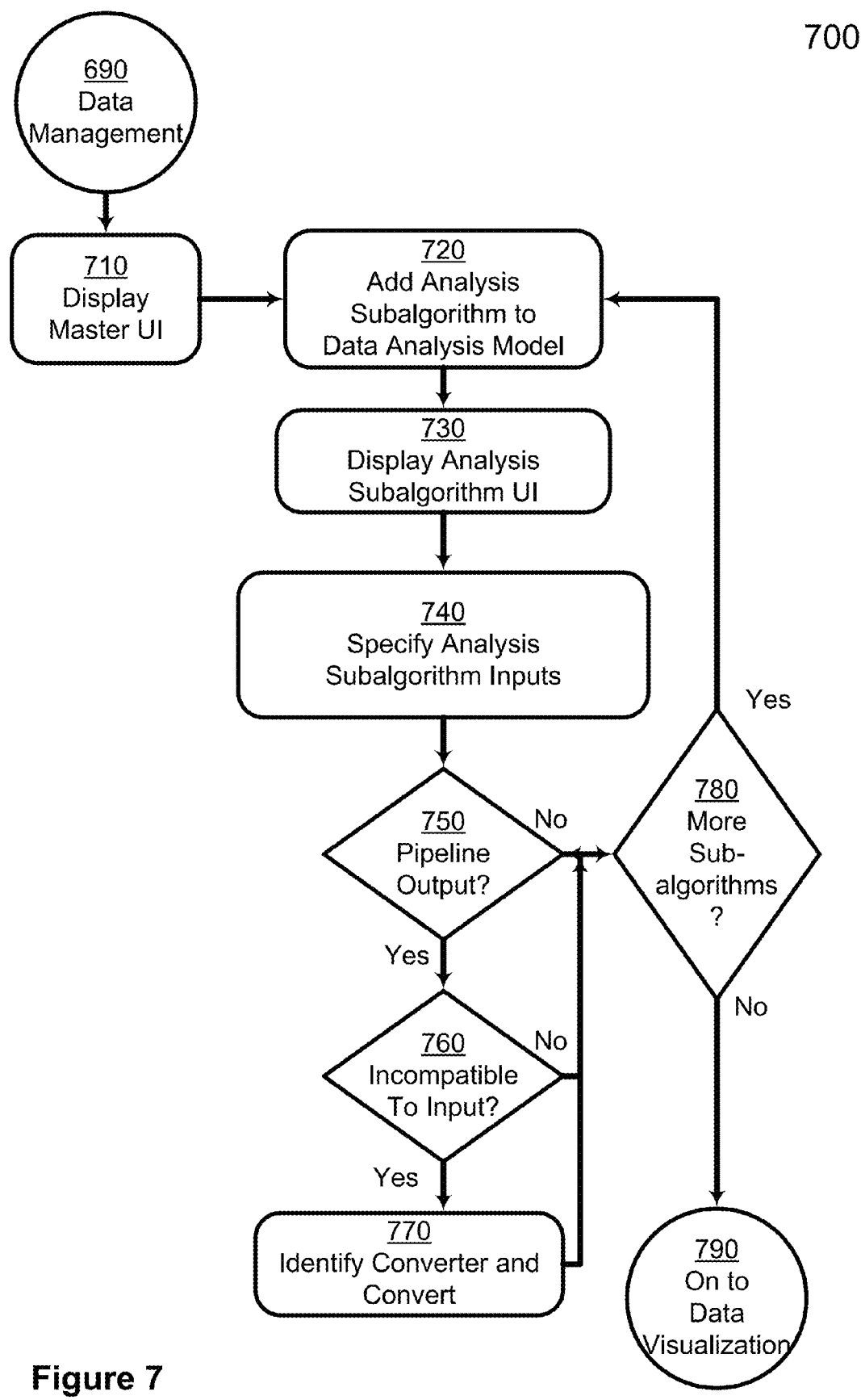
FIG. 7 illustrates a flowchart of an exemplary data analysis process.

FIG. 7 provides a flowchart 700 that is an embodiment of the data analysis process 420. The process comprises displaying a master UI 710, specifying one or more sub-algorithms 720-780, and upon completion, proceeding onto data visualization 430 in step 790. As part of specifying a sub-algorithm, inputs and outputs may be pipelined 750, and converters applied 770 as necessary. An exemplary sub-algorithm is described with reference to FIG. 8.

In 690, the data management process has just completed (see FIG. 6) and the data model and its corresponding datasets are made available to the data analysis process.

Once the data analysis model is complete, analysis algorithms may be identified and brought to bear onto the data analysis model. A common technique to identify analysis algorithms is to display a master UI in 710. The master UI 710 may provide a description of data analysis in general, and may provide multiple levels of description. The master UI may be provided by the tutorial UI as discussed in item 342. Accordingly, the master UI might be a "conversational" UI as described in item 342 above. In fact, a conversational UI may be preferential since the documentation applied to the UI is closely tied to informing the user on how individual analysis algorithms work and how to choose analysis algorithms for the data analysis model. A conversational UI further assists in educating users not necessarily familiar with the fields of study covered by the analysis algorithms.

In 720, the user will select at least one analysis algorithm to apply to the data analysis model. If the analysis algorithm is to be pipelined with other analysis algorithms, then the algorithm becomes a sub-algorithm. Upon selection, in 730, the data analysis process displays a UI for the sub-algorithm. As discussed regarding item 343, each analysis algorithm 344 may have a corresponding UI 343. In 730, the data analysis process may present this UI 343 or may provide another predetermined UI.

In 730, the UI is displayed to a user to specify the inputs for the selected analysis algorithm. An input may be part or the entire data analysis model. However, an input may be the output of a previously selected analysis algorithm, i.e. the output may be pipelined into an input. If the data analysis process determines that two analysis algorithms are being pipelined in 750, and further determines the output does not have the correct format for the input 760, the distributed analysis process may affirmatively select a known converter that will create the necessary compatibility 770. At this point, more analysis algorithms may be specified in 780, and processing returns to 720. However, if the final analysis algorithm has been specified, the distributed analysis platform in step 790 will proceed to the data visualization and data exploration process 430.

Figure 8:
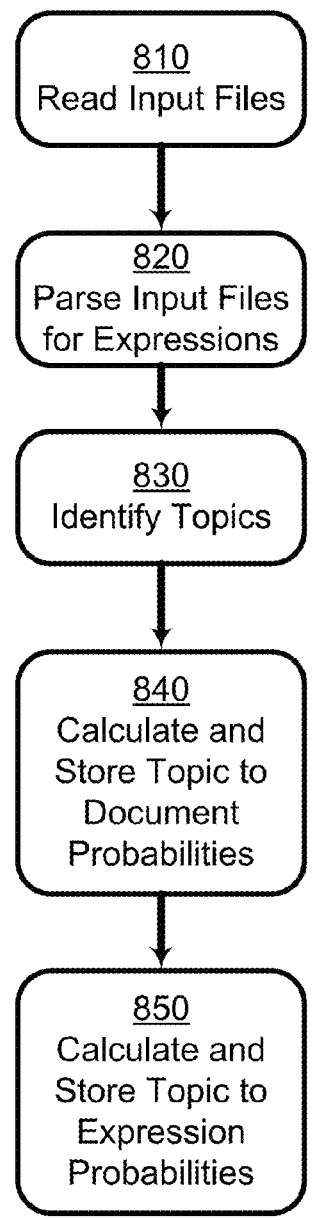
FIG. 8 illustrates a flowchart of network analysis as performed within the context of FIG. 7.

FIG. 8 provides an exemplary sub-algorithm that might be applied in 720 or 780 in the flowchart of FIG. 7. It specifically creates the topic to document probability matrix and the topic to expression probability matrix commonly used in network analysis. Note that these matrices may not be needed in other types of analysis, and the data mining context during the operation of FIG. 7 need not be that of network analysis.

In 810, the set of input files in the data model are read and then in 820 tokenized and parsed. If the inputs are data streams or records in an external database, that data is analogously tokenized and parsed as well.

The tokenizing and parsing process in 820 identifies tokens, sets of tokens ("expressions") or other patterns of interest. For example, in one implementation of network analysis searches for expressions that may potentially be the names of topics. Assuming the tokenizer and parser used in 820 searches for spaces and other whitespace, the single words "Physics" and "Chemistry" would be tokens. The words "Quantum" and "Mechanics" as single words also would be tokens. However the proper phrase for a topic would be the two tokens together as "Quantum Mechanics." Such a term would be an expression in this case.

The tokenizing and parsing process in 820 merely provides expressions, but it does not determine which expressions are expressions of interest. Topic identification in 830 may use many methods of identifying potential expressions of interest. In network analysis, the expressions "Physics", "Chemistry", and "Quantum Mechanics" may be parsed during 820 and identified as potential topics. In the topic identification process 830, these expressions are determined whether they are likely expressions of interest or not.

The topic identification process in 830 may compare expressions to a list of predetermined topics provided by a user or administrator. It may perform statistical analysis seeking frequency or correlation of terms. It may perform analysis of titles and headings by parsing the input set of files. In an extreme case, it may simply treat all expression as potential expressions of interest and let later analysis determine the likelihood that the expressions are of interest.

In 840 and 850, a data analysis model is created. In this example of network analysis, in 840, the process creates a topic to document probability matrix where an identified expression of interest is a topic and files are documents. A probability that an individual document (in the form of an input file) relates to a topic is calculated according to a standard data mining algorithm. In this case of network analysis in 850, the process creates a topic to expression probability matrix where the probability that an individual expressions relates to a topic is again calculated by a standard data mining algorithm. While the example discussion relates to network analysis, 840 and 850 could relate to the creation of intermediate representations for general data analysis that is a data analysis model.

Figure 9A:
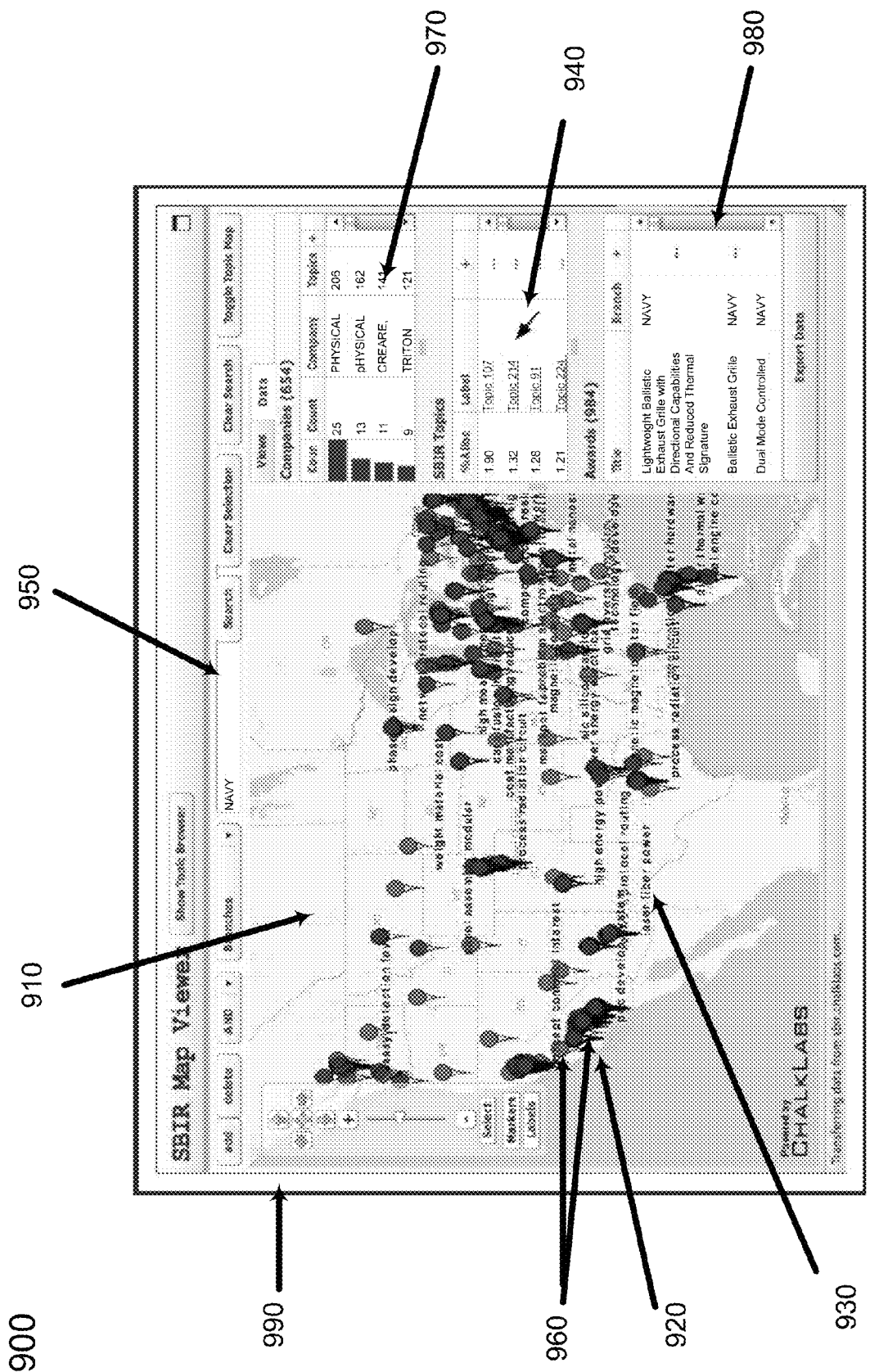
FIGS. 9A and 9B illustrate a exemplary user interfaces.
Figure 9B:
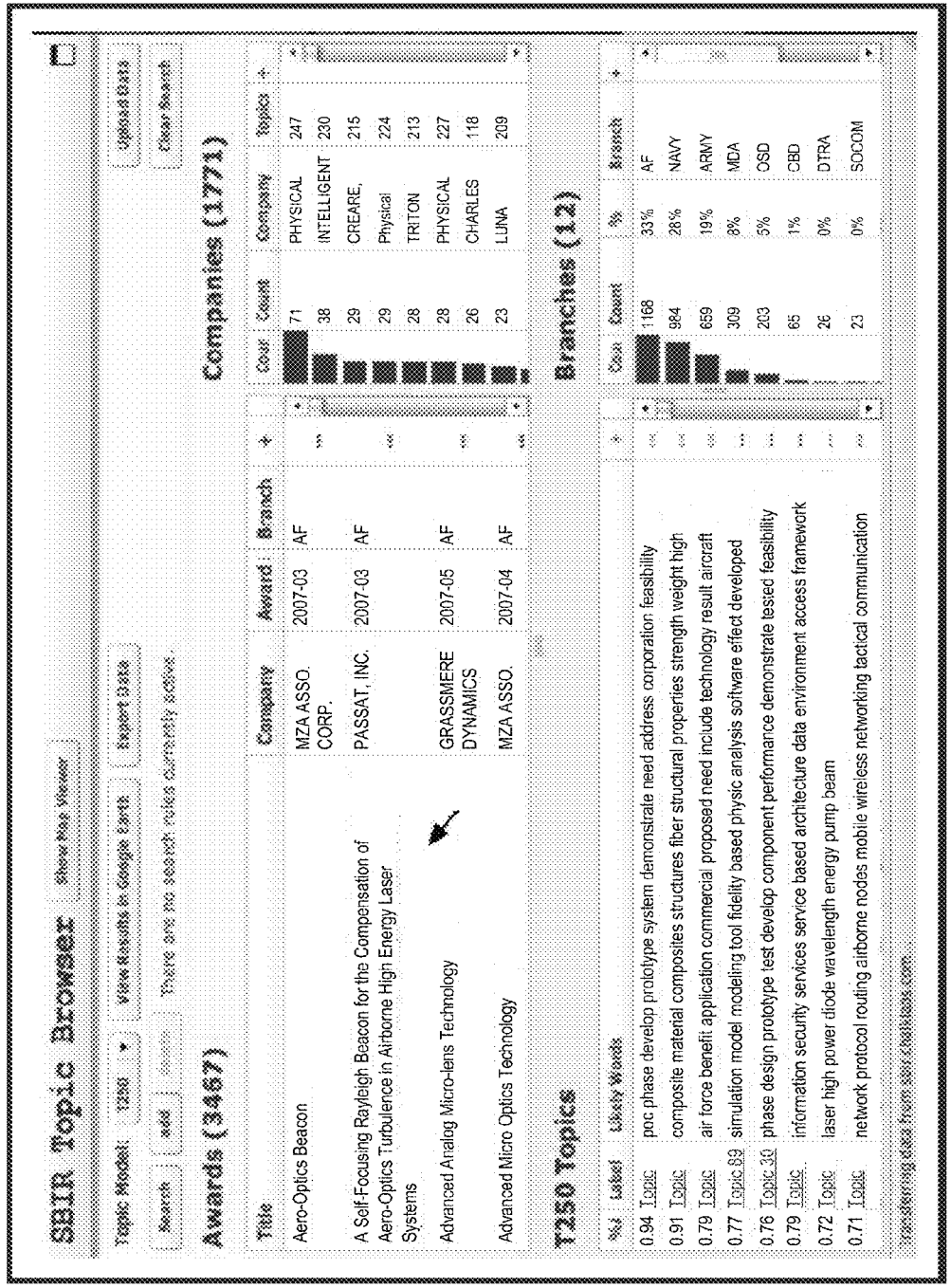

FIGS. 9A and 9B provide exemplary UI 900 for data analysis. Here, the form of data analysis is network analysis, and the graphical representation is a geographic map 910.

In geographic map 910, nodes correspond to events of interest that have occurred in a geographic location. For example, if grants have been allocated to San Diego, Calif., the events may be indicated via points on the map 920. Terms of interest are indicated via labels 930. For example, "laser fiber power" are terms relating to a grant cluster in Arizona. Cursor 940 enables selection of data in the map as well as in widgets in the UI.

A search box 950 enables text search on the data and potentially provides a means to add query criteria, thereby narrowing the underlying data.

Nodes 960 may be made darker or lighter according to some scale. For example lighter nodes may indicate smaller grants and darker nodes may indicate larger grants. Alternatively, nodes may be color coded.

Categories may be displayed in chart 970. Here the categories correspond to companies. The chart may be in the form of a histogram, or pie chart, or other typical chart. Certainly text based widgets, such as grids and scroll boxes 980 may be used to browse data as well. Each record may be clicked on for more information.

Pan and zoom control 990 allows for navigation of the map. Panning is accomplished by a directional pad. The up, down, left and right arrows pan up, down, left and right respectively. The button at the center of the directional pad enables the view to be recentered. The zoom slider allows the depth of field to change either to maximum, where the entire map is viewable, to minimum where a handful of data nodes are shown. Pan and zoom control 990 is discussed in greater detail in the discussion of FIG. 10.

The map representation 910 need not be a geographical map. For example, the map 910 alternatively may be a network map. In a network map, nodes would be proximate to other nodes with similar topics. Similar to the geographic map, topic names would be provided via labels. In a network map, the more relevant a data node is to a particular topic, the closer they would be to each other. Thus data node clusters would graphically indicate data nodes of interest.

FIG. 9B illustrates a non-graphical alternative to presenting data, where all widgets presented are text based. In this figure, Topic Browser 995 shows grid and scroll box widgets instead of a geographic or network map.

Data Visualization and Data Exploration

Figure 10:
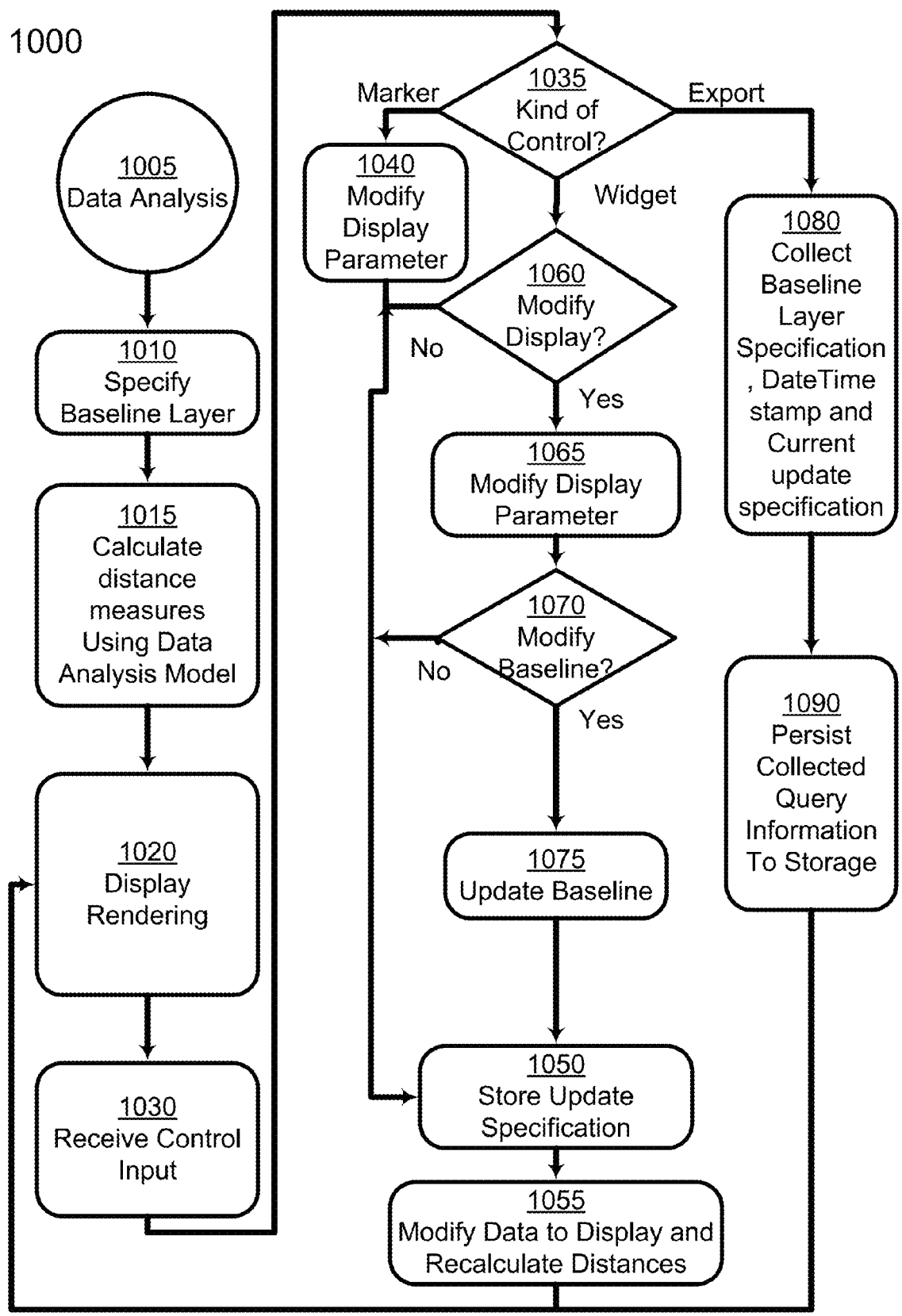
FIG. 10 illustrates a flowchart of an exemplary data visualization and data exploration process.

Once the data analysis model is complete, the distributed analysis platform will perform the data visualization and data exploration process 430. The data visualization and data exploration process 430 applies at least one selected analysis algorithm to the data analysis model. If multiple analysis algorithms have been selected and have been pipelined, the pipelined analysis algorithms can be applied to the data analysis model. The results from applying the analysis algorithms are then displayed, and a user may apply markers, widgets/gadget, or export the view and the data extracted from the data analysis model as a query. The user may also invoke other UI to navigate as necessary. FIG. 10 provides a flowchart 1000 that is an embodiment of the data visualization and data exploration process in 430.

In step 1005, the data analysis process described in FIG. 7 is completed, and in step 1010, a baseline layer is specified. Specifically, at least some subset of the data loaded into the data model will be subjected to the data analysis model algorithms. This subset of data is obtained by identifying one or more query criteria and then performing the corresponding query. The data display 351 will store the set of query criteria, which is called a baseline layer specification. The query result becomes the baseline layer, so called because this preferentially will never be expanded. If the subset is to be increased, preferentially a new data analysis model might be created. However, in some cases, such as working with large amounts of data, it may be desirable to allow for expanding the baseline layer. If the subset specified for the baseline layer is not a proper subset, data from the proper subset not yet in the baseline layer might be added, thus expanding the baseline layer.

In 1015, one or more potentially pipelined data analysis algorithms as selected in the data analysis model are applied to the baseline layer. Part of the calculations in applying the analysis algorithms includes calculating rendering data for the graphical representation. For example, in the case of network analysis, each expression or each document to be mapped is given a set of location coordinates for display as a network map or graph. An example algorithm to perform these calculations in order to generate these network maps is DrL. In some cases, such as the example of a textual display, no location information generation may be necessary.

In 1020, the graphical representation is displayed, i.e. the data visualization process is completed. It is to be noted that for large amounts of data, the processing in 1010, 1015, and 1020 may be computationally intensive, and accordingly may have to be performed offline. However, preferentially, with sufficient processing power, the process may be performed online. Running analysis algorithms may be monitored by a utility such as a task manager. The task manager may provide a list of running or queued analysis algorithms, may show what percentage of the algorithm processing is complete, or may provide estimates of how much time is necessary for completion of a sub-algorithm or of the entire pipelined algorithm. If the amount of time to finish processing is unacceptable, a task manager may allow termination of processing. When the analysis algorithm processing is complete, the task manager may provide a notification to a user. In either case, offline or online, the displayed data will be manipulated further during the data exploration process.

In the data exploration process, controls may be used to manipulate the displayed data 1035. Specifically, the user may apply a marker 353; widget/gadget 352; various layers or overlays may be turned on or off; or may export a query per 346.

In addition to maintaining the baseline layer specification, the data display 351 will maintain at least one or more display parameters, each display parameter storing some state about at least one attribute of the graphical presentation. The complete set of display parameters constitutes the state of the graphical presentation. When at least one display parameter is changed, the changed display parameters are called an update specification. The data display 351 changes the stored display parameters. Thus if these parameters are exported along with the data model and data analysis model, the current data visualization may be reproduced.

For example, in labeling data, there may be display parameters storing a flag indicating whether or not labels should be shown, storing the font type, storing the font size, and storing font color. Markers may also specify subsets of data for highlighting after a data analysis algorithm has been applied or a query performed on the data. In this example, there may be display parameters specifying a bounding box for the selected data, and perhaps a color to overlay over the bounding box.

Markers are typified by modifying the data display 351 without modifying the underlying data. If in 1035 input from a marker is received, the relevant display parameters are modified in 1040. The modified display parameters constitute an update specification and in 1050 data display 351 stores the changes. In 1055, the distances are recalculated according to the data analysis model in the same fashion as in 1015, and re-rendered in 1020.

In general, additional data about the baseline data, such as labels, can be created in what are called overlays. Example overlays are labels, highlighted areas, and where applied to the base layer of data, pushpins. The additional data may be complex and interactive. For example, a user may add annotation data to graphical representation. Another user may add a control that shows statistical data, such as data count within a certain bounding box. The processing to add overlays to a graphical presentation may be subdivided out.

Widgets and gadgets may modify the underlying data. Widgets, unlike gadgets may modify display parameters. If in 1035 input from a widget or gadget is received, first the data exploration process determines if the display is to be modified in 1060. If the control is a widget, it modifies the display parameters in 1065 in the same fashion as in 1040. Note if the control is a gadget, no UI input other than activation is needed and therefore there is no display parameter modification.

In 1070, the underlying baseline data may potentially be modified. Specifically, if a widget or gadget is used to modify the underlying query, the data in the baseline layer is updated and/or the visual representation of the baseline layer may be modified accordingly in 1075. In one example, additional criteria are specified thus narrowing the baseline data to be displayed. In this way, a user may drill down in greater specificity on a large set of data to a much smaller set of data. This operation is relatively fast since the additional criteria specified need only operate on the baseline data rather than the full data model. In fact, this is the preferential mode in online analysis. Another example would be to expand the baseline data by removing one of the criteria in the original query. This may not be preferable since it may require a new baseline layer to be recalculated and thus potentially force the user to go offline. However, this may be necessary in some instances.

Once the baseline layer specification has been updated with the new criteria and the new baseline layer calculated in 1075, the baseline layer specification and the display parameters are stored in 1050. The underlying data and the distances may be recalculated in 1055 in the same fashion as in 1015. Processing then proceeds to 1020 for display rendering.

An example of how a widget may perform in operation is the notion of a pan and zoom control 990. A pan and zoom control allows a user to pan left/right and up/down on a large network map and to control a depth of field parameter. When the depth of field is large, potentially the entire network map may be seen. When the depth of field is small, perhaps a handful of data items may be seen.

If the entire network map shows 1,000 items, the maximum depth of field may show all 1,000 items, and the minimum depth of field may show potentially only one item. If a user wishes to look at a medium depth of field halfway between the maximum and minimum, the user may see only 500 items. In operation, the widget would receive indication from the user to go to a medium depth of field, perhaps through a slider control. The slider control would change the depth of field display parameter accordingly, update the specification for data display 351, and upon recalculation display the updated graphical representation in 1020. The user may not be looking at the 500 items he or she wants and may have to pan. The user may use the pan control, perhaps in the form of a directional pad control to move left. Upon receiving mouse clicks on the left button of the directional pad control, the display parameter of the coordinates of the center of the data display's bounding box would move to the left. For example, if the coordinates were Cartesian coordinates, the y-value would become smaller or become negative. Again the specification for the data display 351 would become updated, and upon recalculation updated graphical representation displayed in 1020.

As a point of practicality, the reason to zoom into a network map is if the data displayed in the graphical representation is too dense to make out at a certain depth of field. Display parameters may be provided to indicate the proper density of labels. At any point in time, only perhaps 10 labels are shown at any time. So at a high depth of field, only 10 high level labels may be shown. However, upon zooming to midlevel, 10 labels are still displayed, but the labels displayed are for the clusters of data discernable at midlevel.

As another point of practicality, the size of the nodes in a network map will stay the same size. If the node size was scaled according to zoom, features in particularly dense clusters of data would not be discernable. Thus regardless if the depth of field is set to maximum, minimum, or in some intermediate value, the node size will remain the same on the graphical representation. Alternatively, the size may differ slightly depending on the zoom level where the top level has smaller nodes that get slightly larger upon zooming in. However, the increase of node size is not linear.

In some embodiments, a query may be exported. If, in 1035, a user triggers a control to export the query, the data model, the data analysis model, the baseline layer of data specification, and the current update specification of the display re-collected in 1080, along with a datetime stamp are stored in 1090. One of the advantages of having a centralized system database 320 is that, with the exported query, the data need not be moved.

Rather, by simply storing references to the data model, the data analysis model, plus the baseline specification (query criteria), the update specification (exported display parameters), and a datetime stamp, the entire data visualization at the time of export may be reconstructed on the fly. This provides a very compact way of transferring queries and sharing not just data, but completed analysis.

Hybrid Rendering

Figure 11:
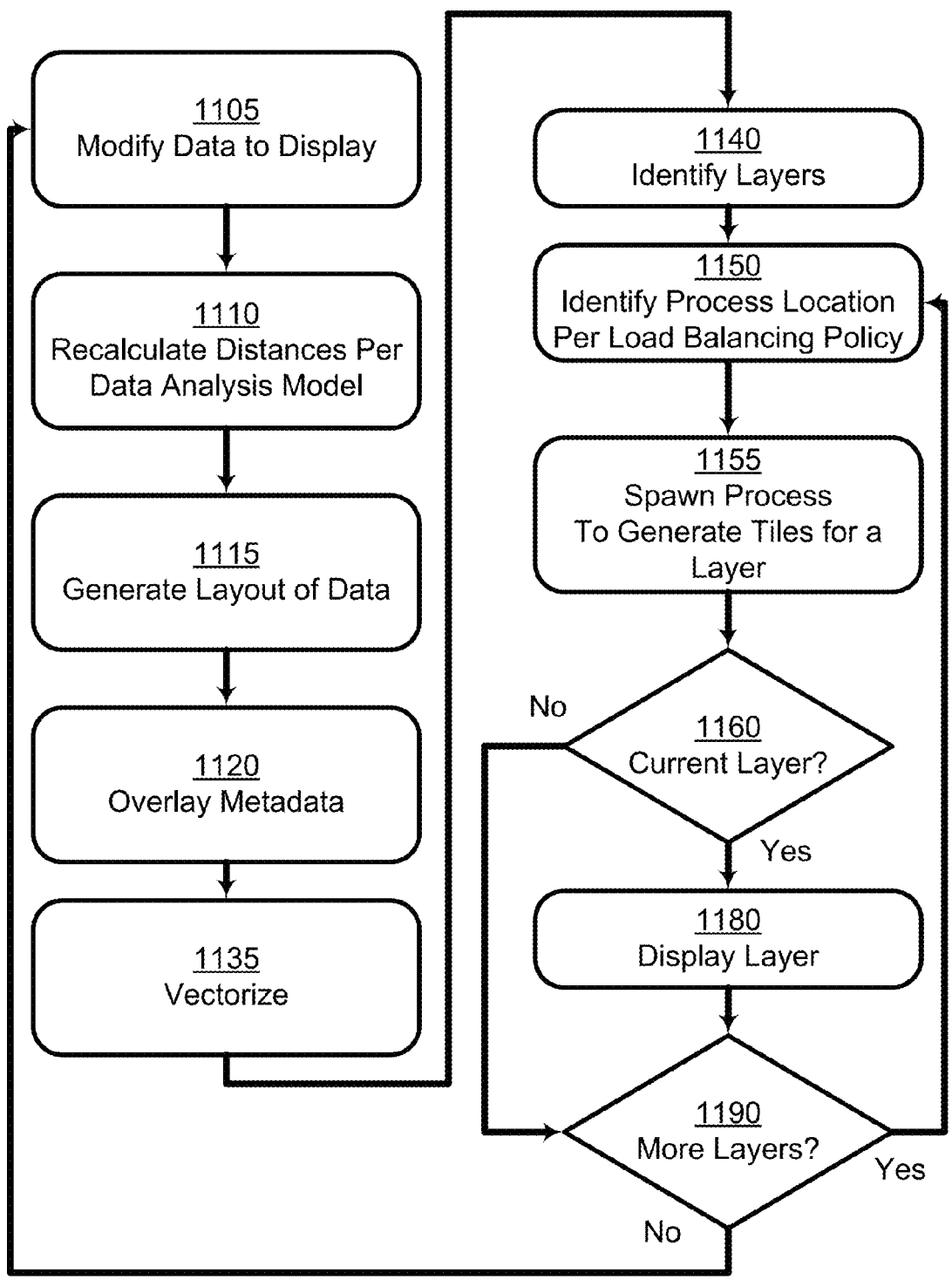
FIG. 11 illustrates a flowchart of an exemplary hybrid data rendering process.

The data visualization process provides the most opportunity to optimize performance. The data display 351 is part of a rendering engine that may take advantage of some optimizations. FIG. 11 provides a flowchart 1100 as an embodiment of the method of hybrid rendering, which includes the load balancing of processing between server and client for data visualization and data exploration as performed by the analysis visualization load balancer 361.

Before discussing FIG. 11, by way of preparation, an exemplary method of rendering is provided below.

First the underlying data for a graphical presentation to be rendered is calculated in 1015. When rendering, a node layout, typically 2-dimensional, is spatially split into a grid of tiles where each tile holds the nodes which intersect that tile, i.e., the bounding box of node. Each tile may contain additional data, but the bounding box and node identifier of each intersecting node is the minimum data that must be stored. Several background processes can be used to calculate the data for the tiles.

The user may specify display parameters for the nodes. Display parameters may include attributes, including but not limited to, shape, size, color, stroke color, transparency or other characteristics. The display parameters would have default settings; for example, node shape will always be a circle. In fact, some display parameters may be a function of a data attribute in the data model. For example, where network analysis was being applied to request for proposal documents, node size or node color could scale according to the amount of funding received, or by grant category.

The display parameters could be applied to multiple layouts using the same dataset, or on multiple datasets assuming compatible schemas, perhaps through an ontology.

The rendering system will retrieve the baseline layer data. The baseline layer data may preferentially be cached locally thereby obviating the need to query the database. Thus rendering may be sped up.

The renderer might render tiles only upon demand. Alternatively, the renderer might render commonly used tiles ahead of demand and then cache. For example the first and second levels of a graphical presentation will be rendered immediately since the amount of data at such a high depth of field typically takes the longest to render.

If the display parameters of a graphical representation are changed, but does not add new attributes to use, then the renderer invalidates the rendered images and redraws, as with a marker.

If the display parameters of a graphical representation are changed, and new attributes of data with which to pull from are added, the relevant data is pulled in; the tiles are invalidated; and then redrawn.

If a node is added, moved, or removed from the layout, it is added or removed from the effected tiles and the associated rendered images will be invalidated and redrawn.

Overlays can be rendered in the same way by having a design which makes irrelevant nodes fully transparent.

Turning to FIG. 11, in 1105, a request to modify the data visualization rendering is received. This may be in the form of a simple marker request or may require a change to the underlying data via a widget or gadget. In 1110, per the request, the data analysis is performed on the dataset or datasets as necessary including a recalculation of any graphical presentation items. For example, in a network map, the distances between the nodes in a network analysis require a recalculation of the distances between the nodes.

In 1115, the data visualization and data exploration software 350 determines a set of locations for the data consistent with the calculations performed in 1110. In some algorithms, the location is also generated along with the distance calculation in 1110 thus obviating step 1115. In 1120, additional layers to the graphical presentation are overlaid over the rendered data. The additional layers include any annotations or highlighting performed by markers or other controls.

Layers are so called as an analogue to physical clear mylar sheets used for overhead presentations, where each sheet had some portion of a final drawing. By overlaying the mylar sheets together on a projector, the entire final drawing could be seen. In software, each layer comprises a set of tiles, usually a set of tessellated squares (i.e. a grid of squares), that hold the portion of the graphical presentation corresponding to that tile. When all the tiles are drawn, the entire layer is drawn. When all the layers are drawn, the entire graphical representation is drawn. Processing may be therefore subdivided by layer or by tile.

In 1135, the different portions of the graphical presentation may be vectorized. Generally the graphical presentation starts out in raster form (bitmaps), which does not scale. By converting the raster data into vector form, the graphical presentation will properly scale upon display or window resizing by the UI. Alternative embodiments where bitmaps are not operated on will not require conversion of raster data to vector form.

Once the graphical presentation data has been vectorized, the graphical presentation data may be subdivided into different layers in 1140. One example is to have the dataset data in one layer, and each different set of marker data in a different layer. Another example is to subdivide the dataset data itself, perhaps according to query criteria. Where there are multiple datasets, another example would be to subdivide the data itself by dataset.

Once the layers have been identified, the location to process each layer may be determined by a load balancing policy 1150. One policy may be to have the marker data processed on the client and the dataset data processed on the server. Another policy may be to dynamically determine available client cycles and to send as much processing to the client as possible. Policies may apply to when processing is performed. If the processing is to be performed on the server where computing cycles are plentiful, the policy may be to render tiles on the fly. Alternatively, on a computing cycle bound client, the policy may be to render tiles only upon demand. If the client is not computing cycle bound, then the policy may be to do all processing on the client. The policy may be predetermined and set by the user, or alternatively dynamically determined. Based on the policy, a process will be spawned on either server or client to generate the graphical tiles that comprise a layer.

In 1160, if the layer is current, that is if the layer's tiles have been recalculated, the layer is drawn on the data display 351 in 1180. Otherwise, a different layer is selected and dispatched accordingly to 1150. After a layer has been drawn to the data display 351 in 1180, another layer is selected.

If all layers are determined to have been dispatched in 1190, processing returns to 1105 to await a new request.

Collaboration Engine

Figure 12:
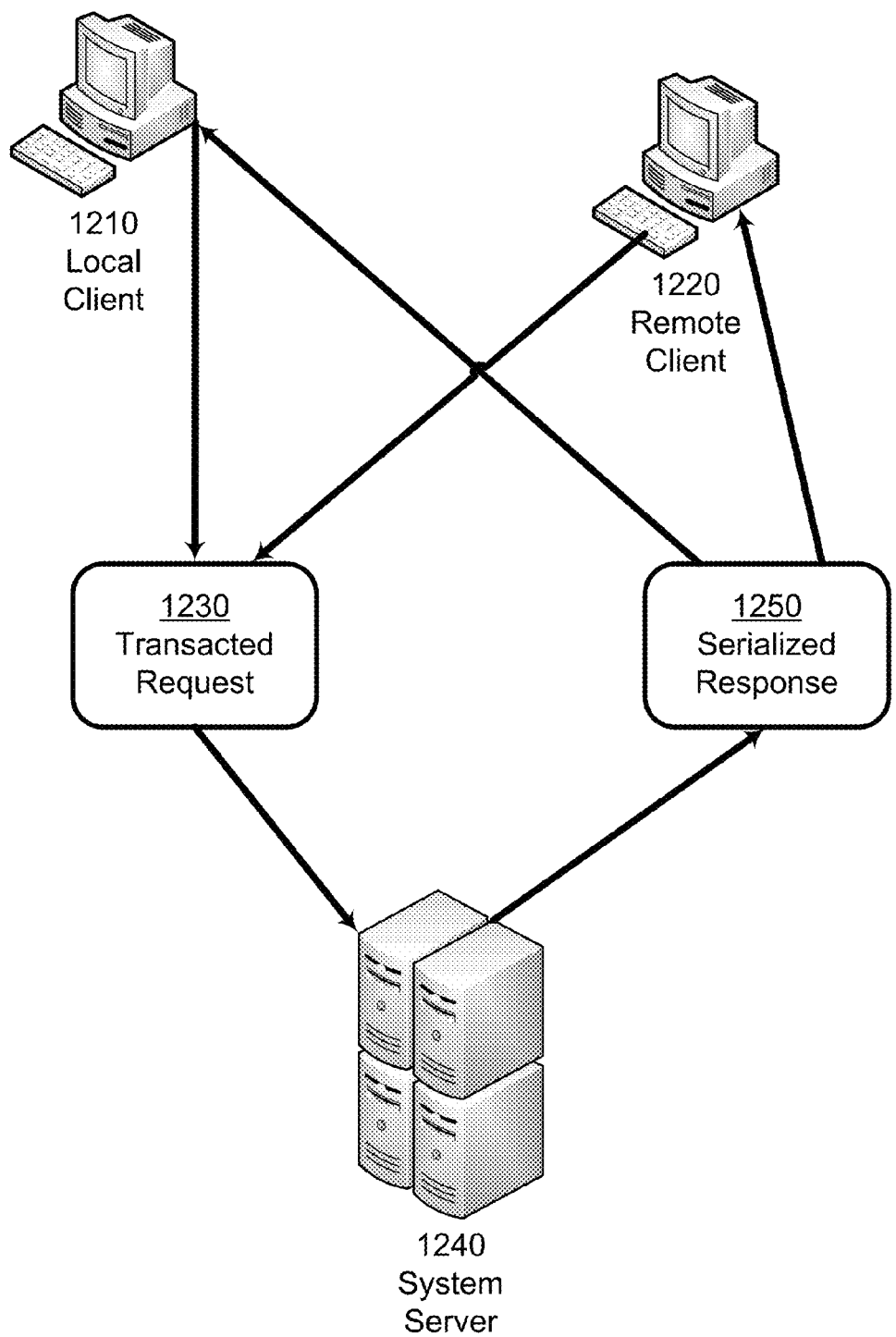
FIG. 12 illustrates a set of transacted requests and responses in an exemplary collaborative embodiment of a distributed framework for performing network analysis.

FIG. 12 illustrates an exemplary collaboration engine 1200. Specifically, the collaboration engine enables a local client 1210 and a remote client 1220 to perform data visualization and data exploration on the same dataset. The terms local and remote simply mean there are two client machines: a first client that accesses local data hosted on the first machine, and second client that accesses the remote data hosted on the first machine. The clients need not be geographically disparate, and indeed may be seated next to each other. The terms local and remote refer more to the possibility that one or more of the datasets to be analyzed may be partially based on the data residing on one of the clients. In this case, the data is local to one of the clients but remote to the other.

Either of the clients 1210 and 1220 may send hypertext transfer protocol ("HTTP") requests via a web browser. The requests may include requests to view the current graphical representation of the dataset, or alternatively may include requests to widgets/gadgets, markers, or other controls on the distributed analysis platform.

If the HTTP requests of the local client 1210 and remote client 1220 arrive at different times, and if there is no risk of contention, and the requests are processed normally.

The HTTP requests of local client 1210 and remote client 1220 may be sent at the same time. To avoid contention, the requests are sent to a modified transaction monitor 1230. The modified transaction monitor first serializes the requests, so that although the requests arrive at the same time, one or the other of the two requests are processed first.

The modified transaction monitor then determines whether or not a data change request is being made. Specifically, if a user is making a first request for a widget or gadget to change the underlying query result or to perform a new analysis, then the transaction monitor must ensure that the second request does not result in an inconsistent result. If no change to the underlying query result or to the data analysis is required, then the first request is processed normally since there is no risk of data contention.

However, if a change to the underlying query result or to the data analysis is required, then the second request is analyzed. If the second request does not require a change to the underlying query result or to the underlying data analysis, then the first request is performed, since there is no risk of contention. In the case that the second request requires a change to the underlying query result or to the data analysis, then the first request is processed to completion and then the second request is processed to completion.

Upon the transaction monitor completing the aforementioned decision, the requests are sent to the system server 1240. The system server 1240 then processes the requests and generates serialized responses 1250.

One problem is that a significant change to the underlying data by a first request may provide an unexpected result to the second request. One option is to perform an estimate of the number of records in the query result, and to send a notification to the second user if the record number is significantly different than the number of records in the present query result. Another option is to simply fail the second request.

Another problem is that the amount of time to process the first request may take an inordinate amount of time, thus causing a delay of the second request. In this case, the second request may time out. Alternatively, the second request may be queued and a response sent to the corresponding user that the second request is being processed. By virtue of queuing the requests, the responses are correspondingly serialized into serialized responses 1250.

A person of ordinary skill in the art will appreciate that the requests need not be HTTP requests and analogues for client server and other architectures exist for the transaction monitor and serialization components of the collaboration engine.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for a computer to generate and present data analysis to a user, comprising:
   receiving at a first computer one or more input files describing subject data;
   generating at the first computer a data model that includes entities and at least one of attributes of the entities or relationships between the entities from the one or more input files;
   storing at the first computer the data model;
   generating at the first computer a data analysis model that at least includes a dataset from the data model for analysis by a plurality of data analysis sub-algorithms of a data analysis algorithm;
   exporting at the first computer the generated data analysis model;
   importing at a second computer the exported data analysis model; and
   performing at the second computer data analysis on the data analysis model that includes the dataset, wherein the data analysis comprises:
      selecting a sequence of data analysis sub-algorithms based on the data analysis model, each data analysis sub-algorithm of the sequence to receive a corresponding input and to perform a statistical analysis on the corresponding input to produce a corresponding output,
      specifying the dataset as an initial input to an initial data analysis sub-algorithm of the sequence,
      pipelining the corresponding output produced by each data analysis sub-algorithm of the sequence as the corresponding input into each subsequent data analysis sub-algorithm,
      terminating the data analysis as a last data analysis sub-algorithm of the sequence produces a final output; and
      presenting the final output on a data display.

2. The method of claim 1, wherein generating the data model from the one or more input files comprises extracting the entities, the attributes of the entities, and the relationships between the entities from the one or more input files.

3. The method of claim 1, wherein the data analysis is network analysis, the data analysis model is a topic model, and the one or more input files include a document.

4. The method of claim 1, wherein the pipelining comprises:
   producing a specific output using a particular data analysis sub-algorithm, determining whether the specific output of the particular data analysis sub-algorithm has a format that is compatible with a subsequent data analysis sub-algorithm in the sequence of data analysis sub-algorithms; and
   in response to determining that the specified output of the particular data analysis sub-algorithm is incompatible with the subsequent data analysis sub-algorithm:
      identifying a converter to convert the format of the specific output of the particular data analysis sub-algorithm to a converted format that is compatible with the subsequent data analysis sub-algorithm of the sequence of data analysis sub-algorithms,
      converting the specific output into a converted output having a converted format that is compatible with the subsequent data analysis sub-algorithm of the sequence of data analysis sub-algorithms using the converter, and
      inputting the converted output into the subsequent data analysis sub-algorithm.

5. The method of claim 4, wherein the identifying the converter includes selecting a first converter that converts the specific output into a first compatible format expected by the subsequent data analysis sub-algorithm in response to determining that a second converter for converting the specific output into a second compatible input format expected by a subsequent data analysis model is not available, the first compatible format being less preferred by the subsequent data analysis sub-algorithm than the second compatible format.

6. The method of claim 1, wherein the specifying the dataset as the initial input to the initial data analysis sub-algorithms includes specifying the initial input via a corresponding graphical user interface of the initial data analysis sub-algorithm.

7. The method of claim 1, wherein specifying the dataset as the dataset as the initial input to a data analysis sub-algorithm comprises:
   presenting at least some help text of a tutorial description of a data analysis sub-algorithm comprising one or more levels of detail to the user via an interactive user interface,
   presenting parameter specifying user interface controls to specify the input and to specify a subsequent data analysis sub-algorithm to receive an output of the data analysis sub-algorithm, and
   presenting help navigation user interface controls to enable the user to navigate through the one or more levels of detail of the tutorial description of the data analysis sub-algorithm.

8. The method of claim 1, wherein at least some of the data analysis is performed on a cloud hosted resource.

9. The method of claim 1, wherein the storing includes storing the subject data in the one or more input files into one of a relational database, an object database, an object relational database, or a columnar database.

10. A computer-implemented system of a plurality of computing devices, each of the plurality of computing devices comprising one or more processors and memory to store computer-executable instructions, the computer-implemented system comprising:
a first computing device having a memory storing computer-executable instructions that when executed with the one or more processors of the first computing device, perform acts comprising:
receiving one or more input files describing subject data;
generating a data model that includes entities and at least one of attributes of the entities or relationship between the entities from the one or more input files;
storing the data model;
generating a data analysis model that at least includes a dataset from the data model for analysis by a data analysis sub-algorithm of a data analysis algorithm; and
exporting the generated data analysis model;
a second computing device having a memory storing computer-executable instructions that when executed with the one or more processors of the first computing device, perform acts comprising:
importing the exported data analysis model;
performing a data analysis on the imported data analysis model that includes the dataset, wherein the data analysis comprises:
selecting a sequence of data analysis sub-algorithms based on the data analysis model, the sequence of data analysis sub-algorithms to perform a statistical analysis on the data analysis model that at least provide a frequency of each data object in the dataset or correlation probabilities between data objects in the dataset, each data analysis sub-algorithm of the sequence to receive a corresponding input and produce a corresponding output,
specifying the dataset as an initial input to an initial data analysis sub-algorithm of the sequence,
pipelining the corresponding output produced by each data analysis sub-algorithm of the sequence as the corresponding input into each subsequent data analysis sub-algorithm,
terminating the data analysis as a last data analysis sub-algorithm of the sequence produces a final output that includes a plurality of nodes associated with data objects connected by edges that represent relationships between the nodes; and
presenting the final output on a data display.

11. The computer-implemented system of claim 10, wherein the one or more input files describe the entities, the attributes of the entities, and the relationships between the entities.

12. The computer-implemented system of claim 10, wherein the data analysis is network analysis, the analysis model is a topic model, and the one or more input files include a document.

13. The computer-implemented system of claim 10, wherein pipelining the at least one output of at least one specified data analysis sub-algorithm comprises:
producing a specific output using a particular data analysis sub-algorithm, determining whether the specific output of the particular data analysis sub-algorithm has a format that is compatible with a subsequent data analysis sub-algorithm; and
in response to determining that the specified output of the particular data analysis sub-algorithm is incompatible with the subsequent data analysis sub-algorithm:
identifying a converter to convert the format of the specific output to a converted format that is compatible with the subsequent data analysis sub-algorithm,
converting the specific output into a converted output having a converted format that is compatible with the subsequent data analysis sub-algorithm using the converter, and
inputting the converted output into the subsequent data analysis sub-algorithm.

14. The computer-implemented system of claim 10, wherein the specifying the dataset as the initial input to the initial data analysis sub-algorithms includes specifying the input via a corresponding graphical user interface of the initial data analysis sub-algorithm.

15. The computer-implemented system of claim 10, wherein specifying the initial input to the initial data analysis sub-algorithm comprises:
presenting at least some help text of a tutorial description of the initial data analysis sub-algorithm comprising one or more levels of detail to a user via an interactive user interface,
presenting parameter specifying user interface controls to specify the initial input and to specify a subsequent data analysis sub-algorithm to receive an output of the initial data analysis sub-algorithm, and
presenting help navigation user interface controls to enable the user to navigate through the one or more levels of detail of the tutorial description of the initial data analysis sub-algorithm.

16. The computer-implemented system of claim 10, wherein at least some of the data analysis is performed on a cloud hosted resource.

17. The computer-implemented system of claim 10, wherein the storing includes storing the subject data in the one or more input files into one of a relational database, an object database, an object relational database, or a columnar database.

18. A method for a computer to generate and present data analysis to a user, comprising:
receiving at a first computer one or more input files describing subject data;
generating at the first computer a data model that includes entities and at least one of attributes of the entities or relationships between the entities from the one or more input files;
storing at the first computer the data model;
generating at the first computer a data analysis model that at least includes a dataset from the data model for analysis by a plurality of data analysis sub-algorithms of a data analysis algorithm;
exporting at the first computer the generated data analysis model;
importing at a second computer the exported data analysis model; and
performing at a second computer a data analysis on the data analysis model that includes the dataset, wherein the data analysis comprises:
selecting a sequence of data analysis sub-algorithms based on the data analysis model to perform a network analysis that calculates location coordinates on a network map or graph for an expression or a document in the one or more input files, each data analysis sub-algorithm to receive a corresponding input and to perform a calculation on the corresponding input to produce a corresponding output, specifying the dataset as an initial input to an initial data analysis sub-algorithm of the sequence, pipelining the corresponding output produced by each data analysis sub-algorithm of the sequence as the corresponding input into each subsequent data analysis sub-algorithm, terminating the data analysis as a last data analysis sub-algorithm of the sequence produces a final output; and presenting the final output on a data display.

19. The method of claim 18, wherein the specifying the dataset as the initial input to the initial data analysis sub-algorithms includes specifying the initial input via a corresponding graphical user interface of the initial data analysis sub-algorithm.

20. The method of claim 18, wherein the storing includes storing the subject data in the one or more input files into one of a relational database, an object database, an object relational database, or a columnar database.

* * * * *